US011891870B2

(12) United States Patent
Maher et al.

(10) Patent No.: US 11,891,870 B2
(45) Date of Patent: Feb. 6, 2024

(54) USE OF HALBACH ARRAY IN DOWNHOLE DEBRIS RETRIEVAL MAGNETS

(71) Applicant: Halliburton Energy Services, Inc., Houston, TX (US)

(72) Inventors: Peter Reid Maher, Lafayette, LA (US); Robert W. Bennett, Sherman, TX (US); David Allen Dockweiler, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/196,388

(22) Filed: Mar. 9, 2021

(65) Prior Publication Data

US 2021/0285301 A1 Sep. 16, 2021

Related U.S. Application Data

(60) Provisional application No. 62/989,559, filed on Mar. 13, 2020.

(51) Int. Cl.

| | |
|---|---|
| ***E21B 31/06*** | (2006.01) |
| ***E21B 37/00*** | (2006.01) |
| ***H01F 7/02*** | (2006.01) |

(52) U.S. Cl.

CPC .............. *E21B 31/06* (2013.01); *E21B 37/00* (2013.01); *H01F 7/0278* (2013.01)

(58) Field of Classification Search

CPC ........ E21B 31/06; E21B 37/00; H01F 7/0278; H01F 7/021; H01F 7/0257; H01F 7/0252

See application file for complete search history.

(56) References Cited

U.S. PATENT DOCUMENTS

| | | | | |
|---|---|---|---|---|
| 6,655,462 | B1 | 12/2003 | Carmichael et al. | |
| 7,219,724 | B2 * | 5/2007 | Theriot, Sr. ............. | E21B 37/00 166/99 |
| 7,541,813 | B2 | 6/2009 | Synder, Jr. et al. | |
| 9,422,781 | B1 * | 8/2016 | Bennett ................... | E21B 31/06 |
| 9,708,890 | B2 | 7/2017 | Skjeie | |
| 10,208,553 | B2 * | 2/2019 | Sullivan .................. | E21B 31/06 |
| 10,436,018 | B2 | 10/2019 | Kouchmeshky et al. | |
| 2005/0274524 | A1 | 12/2005 | Silguero | |
| 2006/0011346 | A1 * | 1/2006 | Theriot ................. | E21B 21/065 166/99 |
| 2013/0000884 | A1 | 1/2013 | Linklater | |

FOREIGN PATENT DOCUMENTS

| | | | |
|---|---|---|---|
| CN | 101205804 | A | 6/2008 |
| RU | 2400619 | C2 | 9/2010 |
| RU | 2619485 | C1 | 5/2017 |
| RU | 2690587 | C2 | 6/2019 |
| WO | 2019240835 | A1 | 12/2019 |

* cited by examiner

*Primary Examiner* — Cathleen R Hutchins

(74) *Attorney, Agent, or Firm* — Scott Richardson; Parker Justiss, P.C.

(57) ABSTRACT

Provided, in one aspect, is a downhole magnetic debris removal apparatus. The downhole magnetic debris removal apparatus, in one aspect, includes a housing having a longitudinal axis, and a plurality of magnets arranged as one or more Halbach arrays of magnets coupled to the housing, the one or more Halbach arrays of magnets having a strong side and a weak side.

20 Claims, 20 Drawing Sheets

USE OF HALBACH ARRAY IN DOWNHOLE DEBRIS RETRIEVAL MAGNETS

CROSS-REFERENCE TO RELATED APPLICATION

This application claims the benefit of U.S. Provisional Application Ser. No. 62/989,559, filed on Mar. 13, 2020, entitled "USE OF HALBACH ARRAY IN DOWNHOLE DEBRIS RETRIEVAL MAGNETS," commonly assigned with this application and incorporated herein by reference in its entirety.

BACKGROUND

During oil/gas drilling processes, metal debris is often found and/or created within a well. Where that debris is magnetic, typically from being sufficiently ferrous, it may be removed by placing a tool having one or magnets within the well. The magnets will attract the magnetic debris from within the well, especially if that debris is dispersed in fluids within the well. Removal of the magnetic debris can reduce processing costs of fluids that are removed from the well and aid production from the well in other ways generally known in the art.

A need exists, therefore, for a magnetic tool with one or more powerful magnets that are safe to install and remove from a tool, an insert to help achieve this goal and a method for safely installing and removing inserts from a magnetic tool.

BRIEF DESCRIPTION

Reference is now made to the following descriptions taken in conjunction with the accompanying drawings, in which.

Figure 13A:
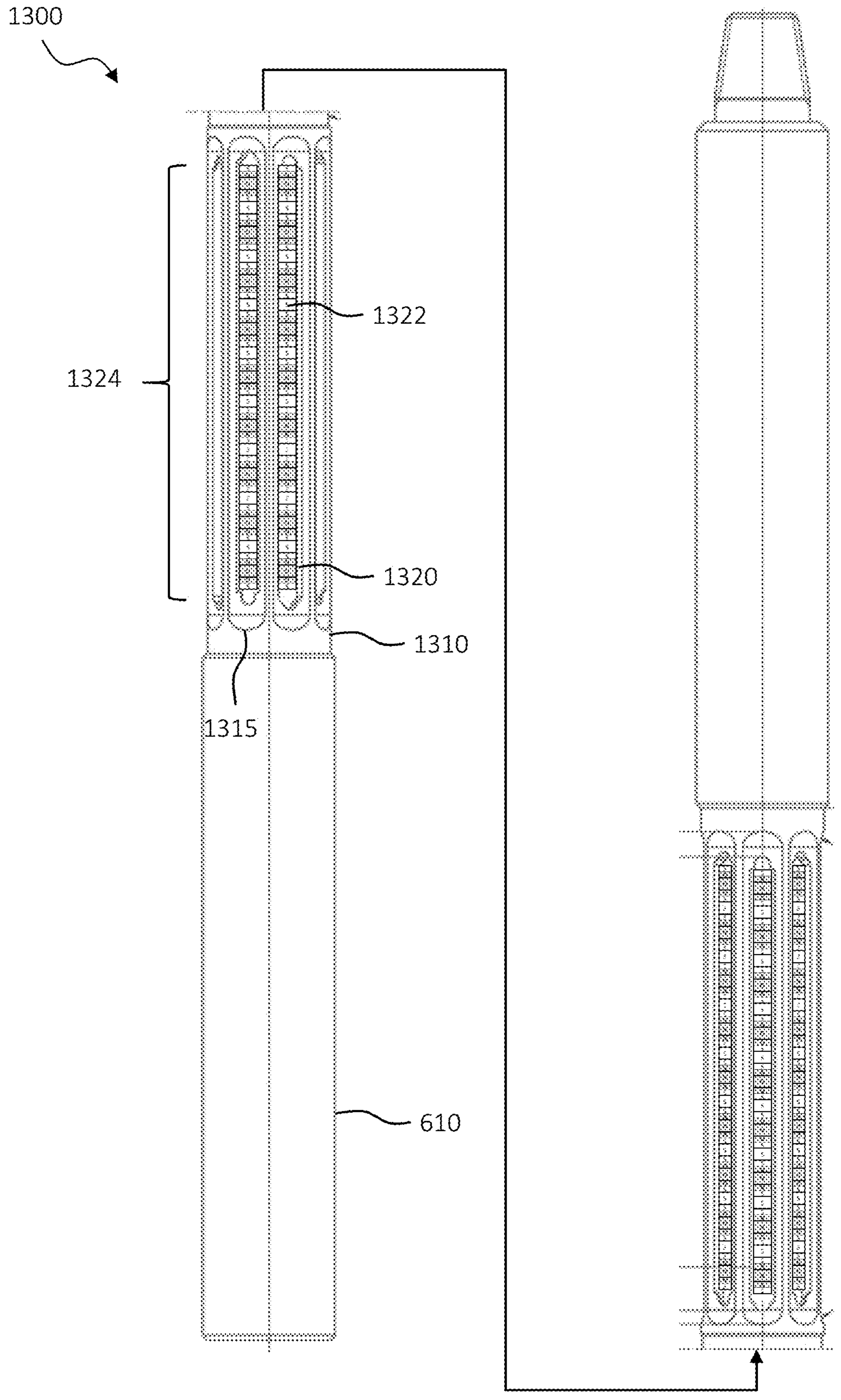
Figure 13B:
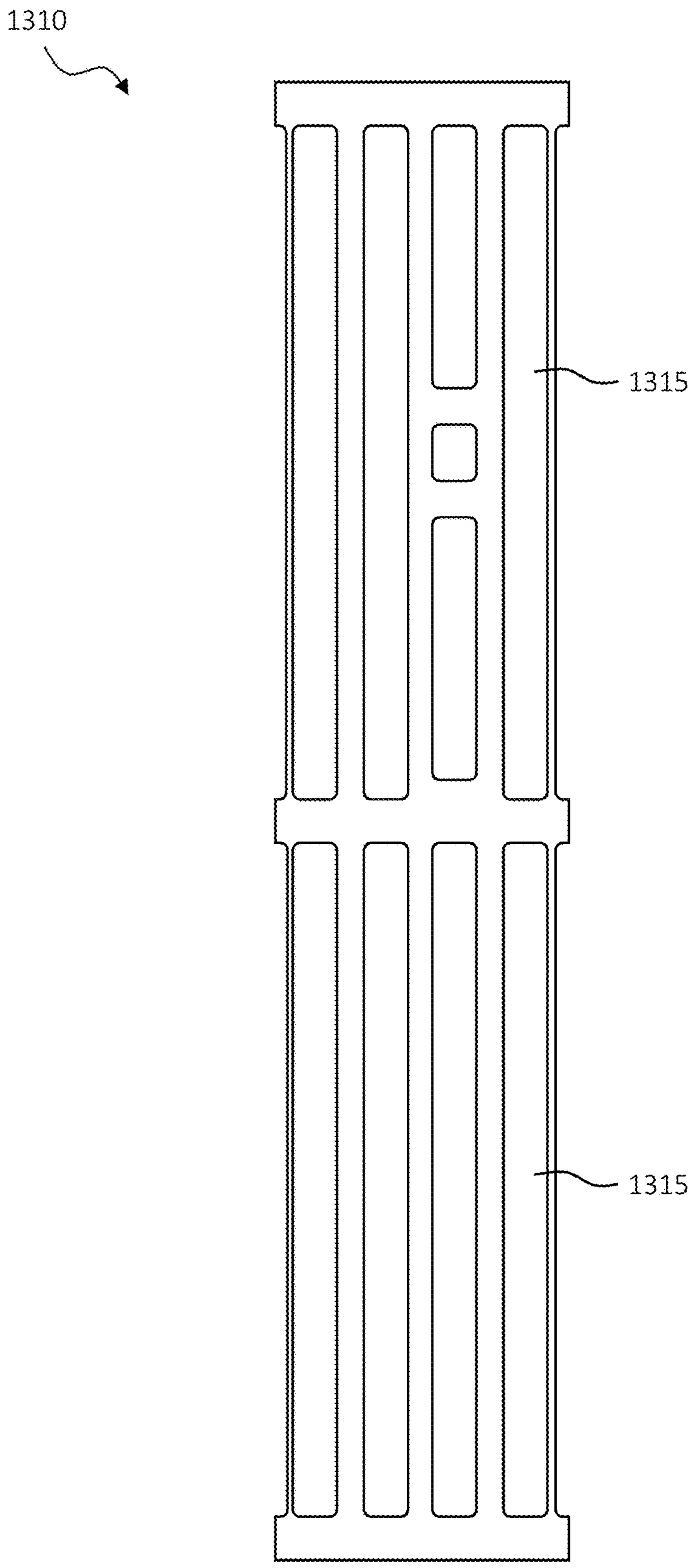
Figure 13C:
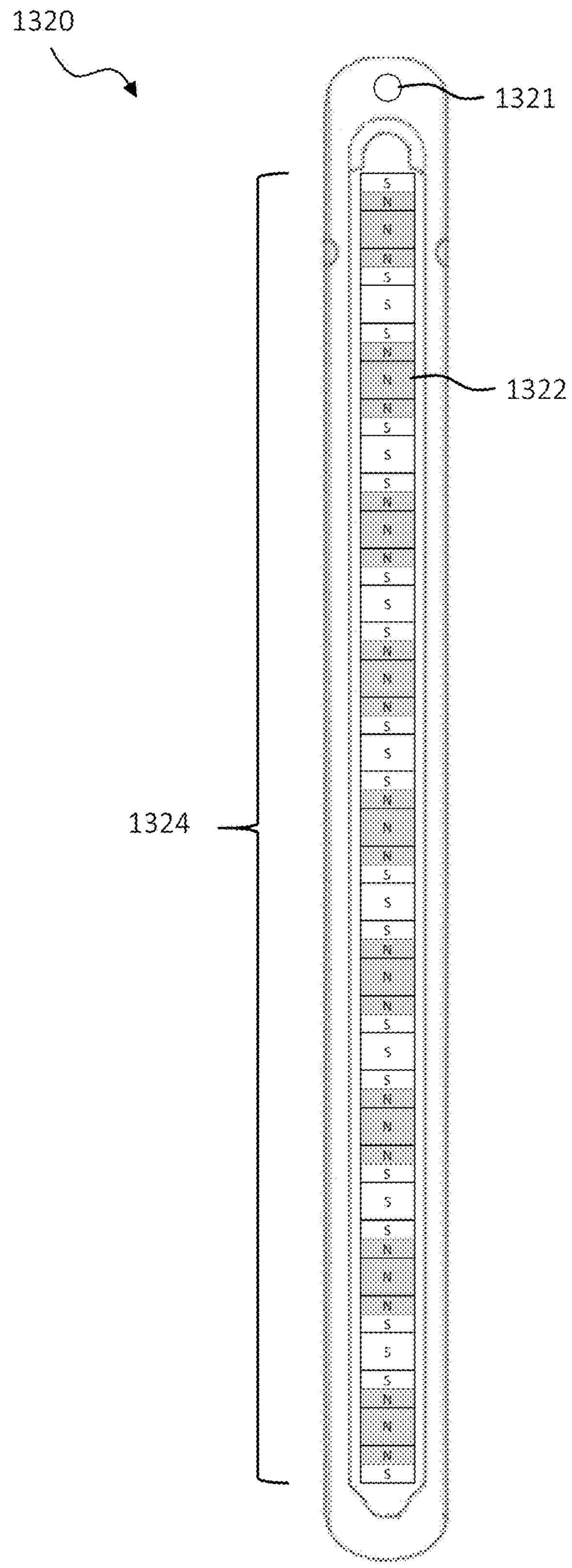
Figure 14:
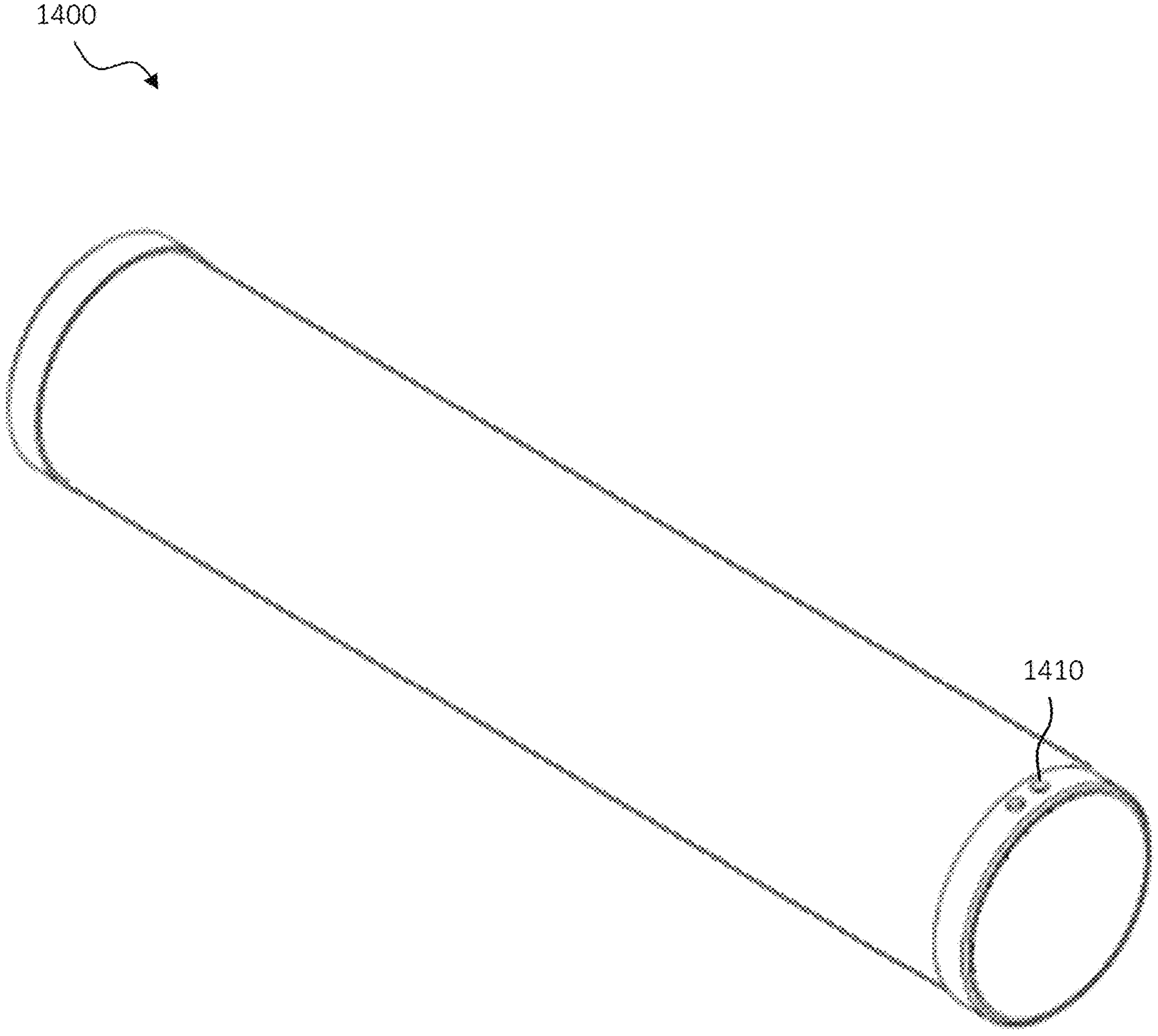
Figure 15:
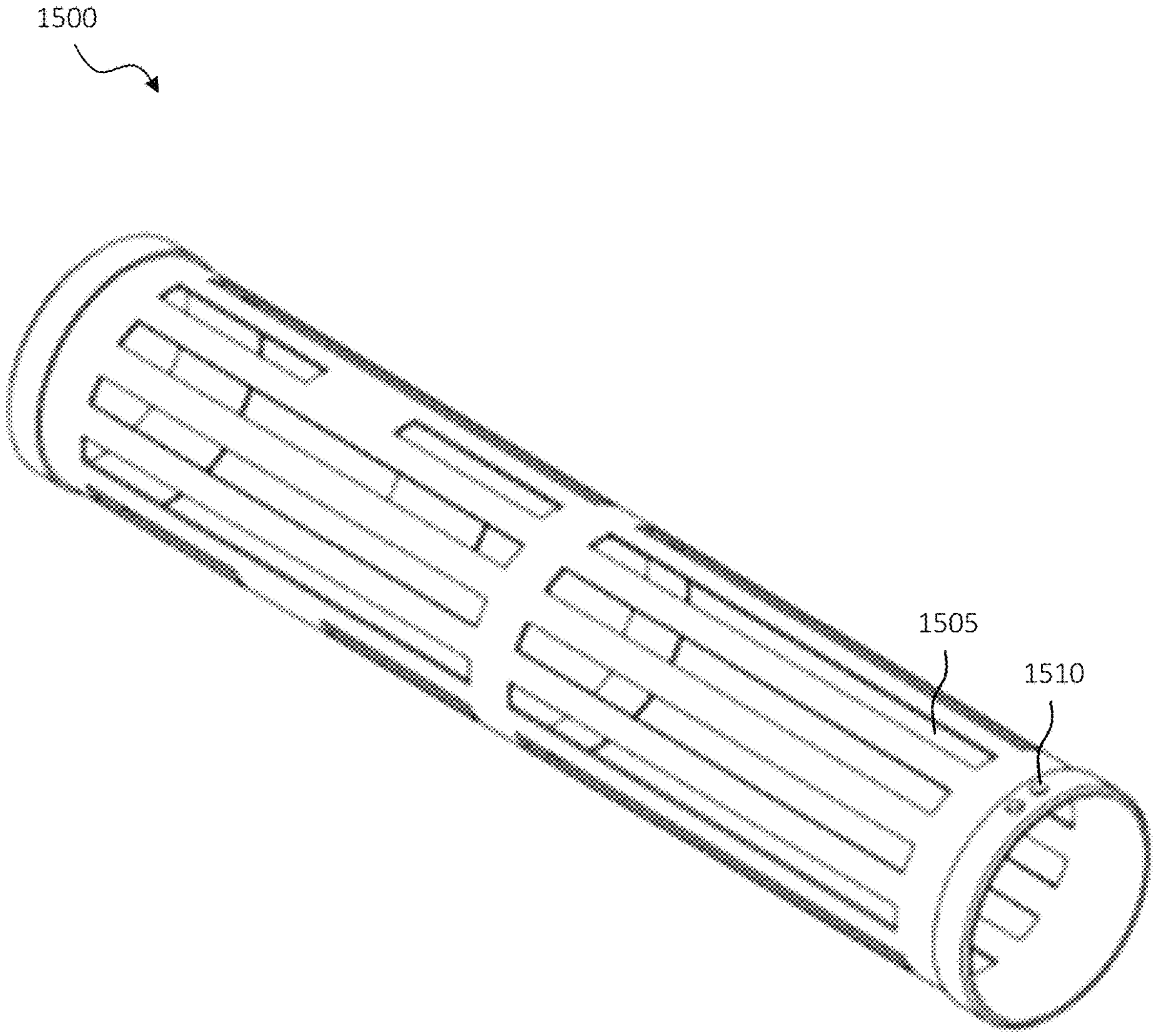

FIGS. 13A through 13C illustrate a downhole magnetic debris removal apparatus designed, manufactured, and operated according to another embodiment of the disclosure FIG. 14, illustrates one embodiment of a retaining sleeve designed, manufactured and operated according to one or more embodiments of the disclosure; and FIG. 15, illustrates an alternative embodiment of a retaining sleeve designed, manufactured and operated according to one or more embodiments of the disclosure.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements, and may also include indirect interaction between the elements described. Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Figure 1:
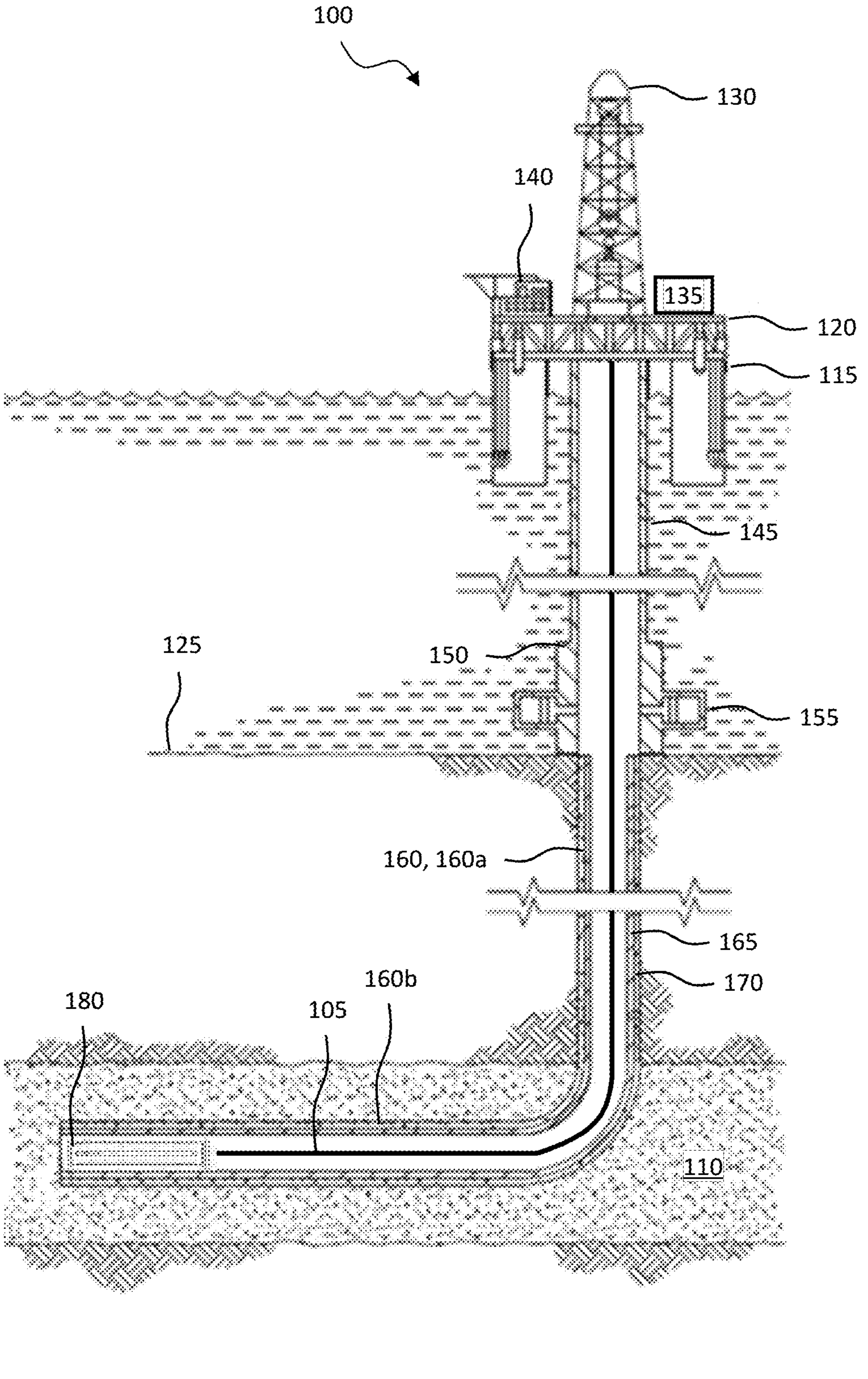
FIG. 1 illustrates a well system, including a downhole magnetic debris removal apparatus, designed, manufactured and run according to the present disclosure.

Referring initially to FIG. 1, schematically illustrated is a well system 100, including a downhole magnetic debris removal apparatus 180, designed, manufactured and run according to the present disclosure. The downhole magnetic debris removal apparatus 180, in the illustrated embodiment, is positioned at a desired location in a subterranean formation 110 using a conveyance 105, such as a pipe, coiled tubing, wireline, slickline, or any other downhole conveyance. The well system 100 of FIG. 1, without limitation, includes a semi-submersible platform 115 having a rig floor 120 positioned over the oil and gas formation 110, which in this embodiment is located below sea floor 125. The semi-submersible platform 115, in the illustrated embodiment, may include a hoisting apparatus/derrick 130 for raising and lowering the downhole magnetic debris removal apparatus 180 via the conveyance 105. The well system 100 may additionally include a fracturing pump 135 for conducting a fracturing process of the subterranean formation 110 according to the disclosure. The well system 100 illustrated in FIG. 1 additionally includes a control system 140 located on the rig floor 120. The control system 140, in one embodiment, may be used to control the fracturing pump 135, among other uses.

In the embodiment of FIG. 1, a subsea conduit 145 extends from the platform 115 to a wellhead installation 150, which may include one or more subsea blow-out preventers 155. A wellbore 160 extends through the various earth strata including the subterranean formation 110. In the embodiment of FIG. 1, wellbore casing 165 is cemented within wellbore 160 by cement 170. In the illustrated embodiment, the wellbore 160 has an initial, generally vertical portion 160*a* and a lower, generally deviated portion 160*b*, which is illustrated as being horizontal. It should be noted, however, that downhole magnetic debris removal apparatus 180 of the present disclosure is equally well-suited for use in other well configurations including, but not limited to, inclined wells, wells with restrictions, non-deviated wells, un-cased wells, partially cased wells, and the like. Moreover, while the wellbore 160 is positioned below the sea floor 125 in the illustrated embodiment of FIG. 1, the principles of the present disclosure are equally as applicable to other subterranean formations, including those encompassing both areas below exposed earth and areas below earth covered by water such as ocean or fresh water.

In accordance with one or more embodiments of the disclosure, the downhole magnetic debris removal apparatus 180 employs a plurality of magnets arranged as one or more Halbach arrays of magnets. A Halbach array is a particular arrangement of magnets that increases the magnetic field on one side of the array and reduces and/or cancels the magnetic field to near zero on the other side. The Halbach array of magnets could be used to maximize the performance and minimize cost of the downhole magnetic debris removal apparatus 180. Being able to provide magnets with more debris recovery improves the downhole magnetic debris removal apparatus 180 and improves the efficiency of wellbore cleanout runs, reducing the chances of debris related issues causing problems with the installation of the completion equipment. Furthermore, minimizing the cost of magnet components improves margins and allows the manufacturer to provide cost competitive products in a highly commoditized market.

Figure 2A:
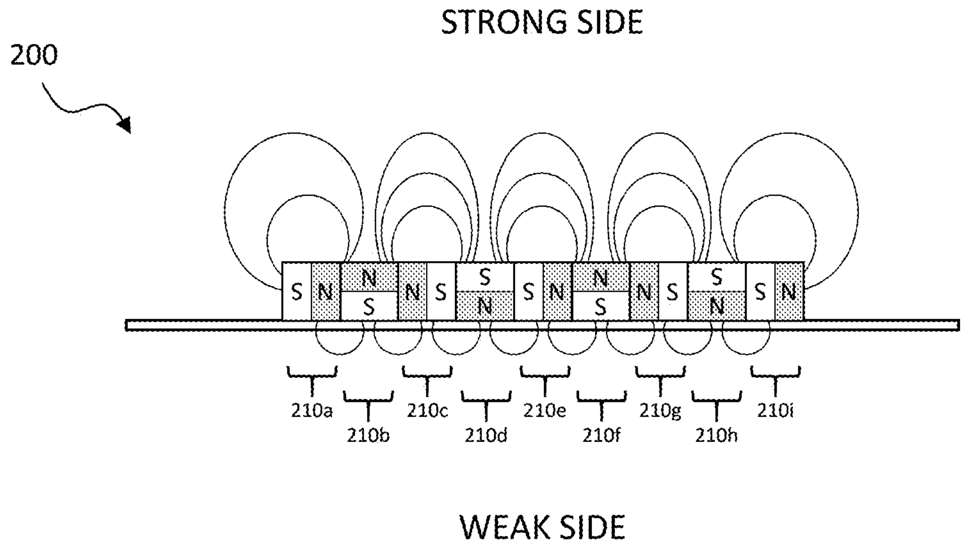
FIGS. 2A and 2B illustrate two examples of a Halbach array of magnets that might be used in a downhole magnetic debris removal apparatus according to the disclosure.
Figure 2B:
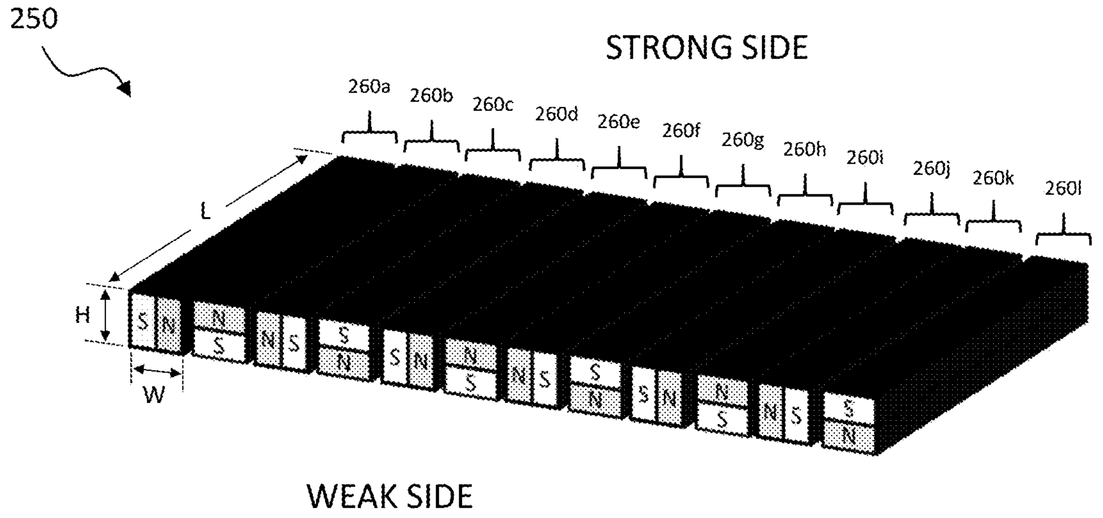

Turning briefly to FIGS. 2A and 2B, illustrated are two examples of a Halbach array of magnets 200, 250, respectively, that might be used in a downhole magnetic debris removal apparatus (e.g., such as the downhole magnetic debris removal apparatus 180) according to the disclosure. As discussed above, the Halbach array of magnets 200, 250, each include a plurality of magnets 210*a*-210*i*, 260*a*-2601 having a positive (e.g., represented with the N) and a negative pole (e.g., represented with the S), respectively. In at least one embodiment, such as that shown in FIG. 2B, each of the magnets 260*a*-260*l* of the Halbach array of magnets 250 have a width (W), height (H), and length (L). In at least one or more embodiments, the length (L) is greater than the width (W) and the height (H). Further to one or more embodiments, the width (W) and the height (H) may be similar to one another, and thus a cross-section taken through the length (L) would yield a square, such as that shown in FIG. 2A.

Figure 3A:
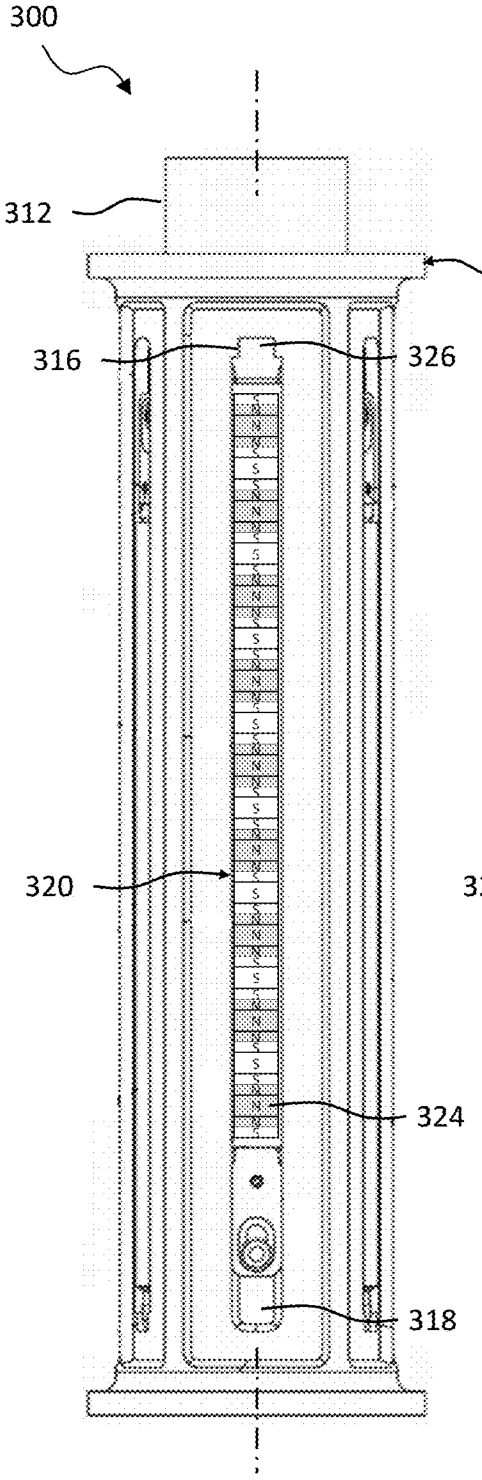
FIGS. 3A and 3B illustrate different views of one such downhole magnetic debris removal apparatus.

FIG. 3A is a perspective view of a downhole magnetic debris removal apparatus 300 for removing metal from a well, the downhole magnetic debris removal apparatus 300 including one or more magnetic inserts 320, at least one of the magnetic inserts 320 having the aforementioned Halbach array of magnets 324. The downhole magnetic debris removal apparatus 300 includes a housing 310 having a longitudinal axis, which may be lowered into a well by its connector 312 to remove metal debris, such as worn parts of bits or other tools, from the fluid in a well. The downhole magnetic debris removal apparatus 300 has several recesses 314 about its perimeter running lengthwise along the downhole magnetic debris removal apparatus 300. Each recess 314 has a tool tab 316 at one end and a threaded toolbore 318 at the opposite end the tab 316. Each recess 314 may accommodate the magnetic insert 320.

Figure 3B:
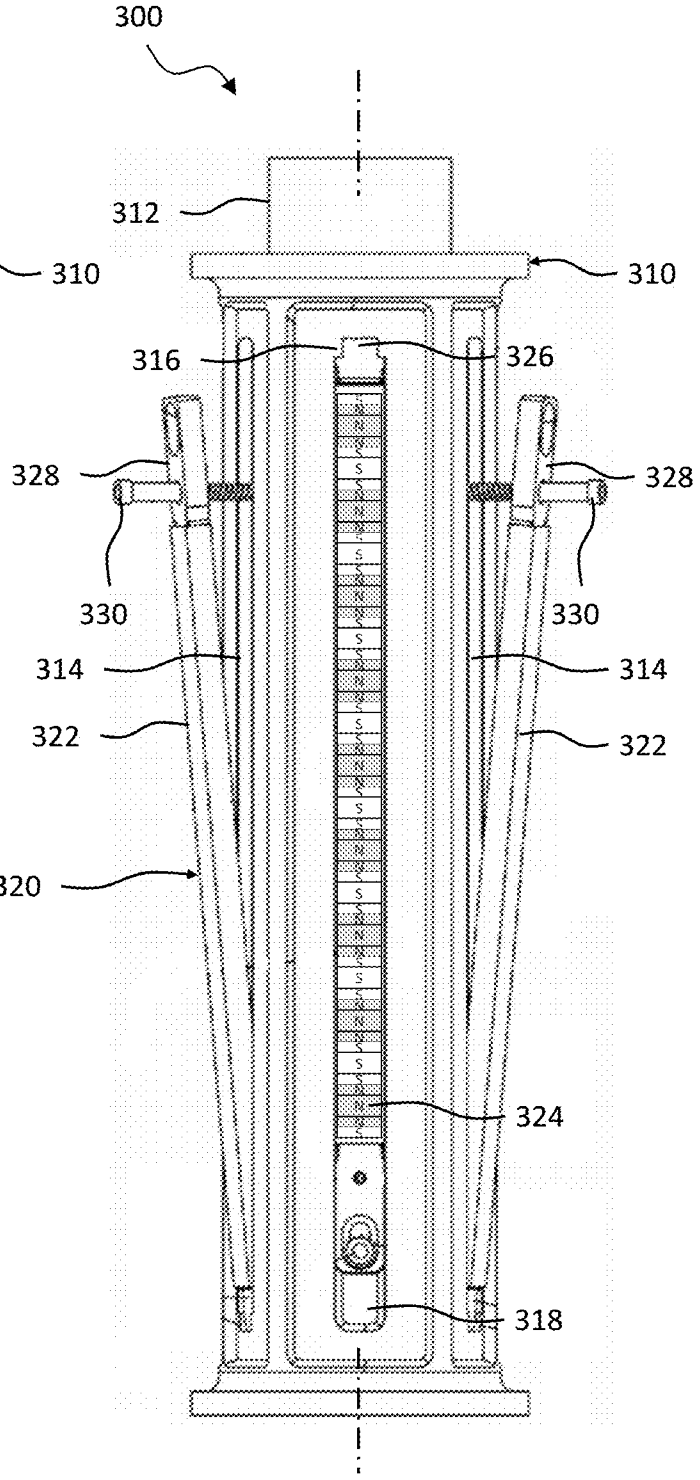

FIG. 3B is a perspective view of the downhole magnetic debris removal apparatus 300 of FIG. 3A with the magnetic insert 320 partially installed in the downhole magnetic debris removal apparatus 300. The magnetic insert 320 has a sleeve 322 holding the Halbach array of magnets 324, as will be described in more detail below. The Halbach array of magnets 324 are visible in FIGS. 3A and 3B, but in fact may be hidden by the sleeve 322, and thus not visible. Nevertheless, the Halbach array of magnets 324 are being shown for illustrative purposes. The sleeve 322 is capped at one end by a lead end piece 326 and at the opposite end by a follow end piece 328. The lead end piece 326 is positioned under tab 316 of the recess 314. The follow end piece 328 is spaced from recess 314 by a placement bolt 330. The partially removed magnetic inserts 320 may either be new inserts being placed or old inserts being removed, as will be discussed below.

Figure 4A:
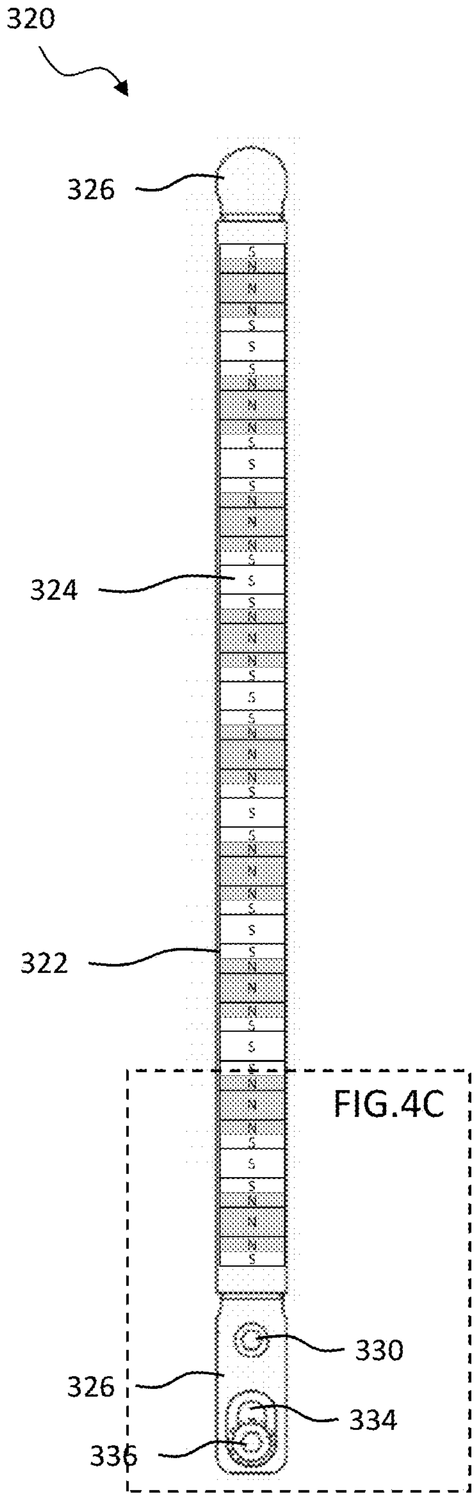
FIGS. 4A through 4D illustrate four different views of the magnetic inserts illustrated in FIGS. 3A and 3B.

FIG. 4A is a top view of one magnetic insert 320 from the downhole magnetic debris removal apparatus 300 of FIGS. 3A and 3B. The insert 320 may have a sleeve 322 capped by a lead end piece 326 and a follow end piece 328. Lead end piece 326 may be rounded as shown to aid in placement and orientation. Follow end piece 328 may have a tapped hole and a smooth bored slot 334. Tapped hole, in at least one embodiment, is threaded to receive placement bolt 330. Smooth bored slot 334 is preferably recessed to receive securing bolt 336 and a washer in at least one embodiment. Sleeve 322, in at least one embodiment, is a tube of ferromagnetic material, such as type 410 stainless steel. Lead end piece 326 and follow end piece 328 are typically formed of non-ferrous material, such as type 303 stainless steel. Lead end piece 326 and follow end piece 328 may be welded to sleeve 322 to seal the sleeve. The Halbach array of magnets 324 are visible in FIGS. 4A, but again may be hidden by the sleeve 322, and thus not visible. Again, the Halbach array of magnets 324 are being shown for illustrative purposes.

Returning to FIGS. 3A and 3B, lead end 326 is placed under tab 316 of the downhole magnetic debris removal apparatus 300 while follow end 328 is held away from recess 314. Follow end 328 may then be lowered until placement bolt 330 is in recess 314, as shown in FIG. 3B. Follow end 328 may then be tapped with a non-metallic hammer to secure lead end 326 under tab 316 in recess 314. Placement bolt 330 is then partially unscrewed from tapped hole to allow follow end piece 328 to be drawn closer to recess 314 by the Halbach array of magnets 324. Follow end 328 may then be tapped with a non-metallic hammer to further secure lead end 326 under tab 316 in recess 314. This process is repeated as necessary to lower the magnetic insert 320 into recess 314 of tool while keeping lead end 326 secured behind tab 316. Once placement bolt 330 is fully unthreaded, follow end piece 328 will be resting in recess 314, and smooth bore 334 should be aligned with threaded tool bore 318 in recess 314. Securing bolt 336 is placed through smooth bore with a washer placed over the threads of the securing bold, above the unthreaded follow end piece 324 and threaded into tool bore 318 to secure follow end 328 and insert 320 into the downhole magnetic debris removal apparatus 300. The washer is preferably a locking type to prevent backing of securing bolt 336. A setscrew may be secured in tapped hole to prevent debris buildup in tapped hole during use and further secure magnetic insert 320 as shown in FIGS. 3A and 3B. Placement bolt 330 allows for magnetic insert 320 to be lowered into recess 314 without the need of a body part, such as a finger, being between magnetic insert 320 and the downhole magnetic debris removal apparatus 300 that could be pinched.

To remove magnetic insert 320 from the downhole magnetic debris removal apparatus 300, follow end 328 may first need to be wiped clear of any debris from use. Setscrews, if used, and securing bolt 336 and washer may then be removed. Placement bolt 330 is then threaded through tapped hole to lift follow end piece 328 from recess 314. Once placement bolt 330 is fully threaded through tapped hole follow end 328 should be safely clear of the downhole magnetic debris removal apparatus 300 and magnetic insert 320 may be removed from the downhole magnetic debris removal apparatus 300 by sliding lead end 326 out from under tab 316.

Figure 4B:
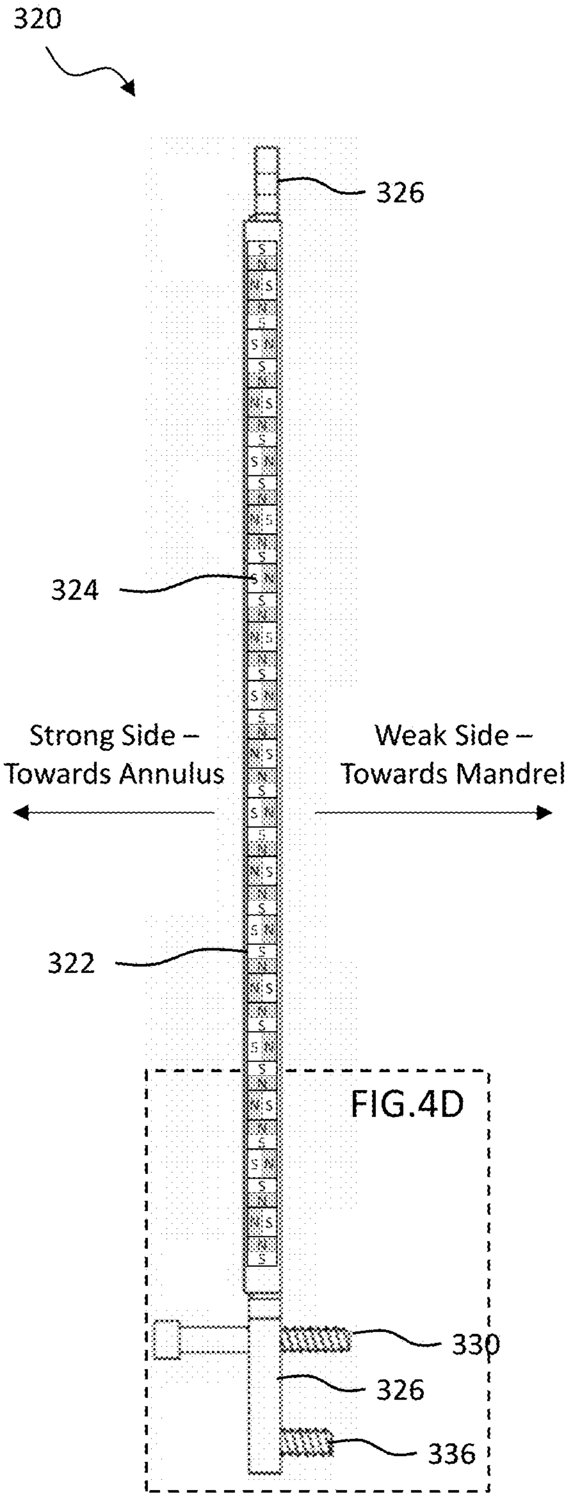

Turning to FIG. 4B illustrated is a sectional side view of the magnetic insert 320 of FIG. 4A. The sectional view allows the Halbach array of magnets 324 to be readily visible. In this example there are a plurality of magnets (e.g., making up the Halbach array of magnets) positioned within sleeve 322, although the number of magnets will depend on the size of the magnetic insert 320. Each magnet has a north pole (N) and a south pole (S). The individual magnets are placed within sleeve 322 so that they create the Halbach array of magnets 324.

Individual magnets may be of various width (W), height (H) and length (L). In at least one embodiment, each magnet has a square cross-section (e.g., when taken through the length (L)). Individual magnets of various thickness dimensions may consist of a single magnet with a specific height (H) or it may consist of two or more magnets that are stacked on top of each other with the magnetic north and south poles of the stacked magnets facing and contacting each other to create a height (H). This may provide a more powerful magnetic circuit, as compared to a thinner single magnet or thinner stack of magnets with the height (H) of magnets or stack of magnets being level across the entirety of the north and south poles for a consistent magnetic circuit from end to end within the sleeve 322. Magnets are often raw magnets such as Neodymium Iron Boron, Ultra High Temperature Neodymium Iron Boron, Samarium Cobalt, Ceramic, or AlNiCo. N4OUH (Neodymium Iron Boron Ultra High Temperature Rated grade 40) raw magnets may be Nickel coated for corrosion prevention. SmCo26 (Samarium Cobalt grade 26) raw magnets may be non-coated in some applications.

Figure 4C:
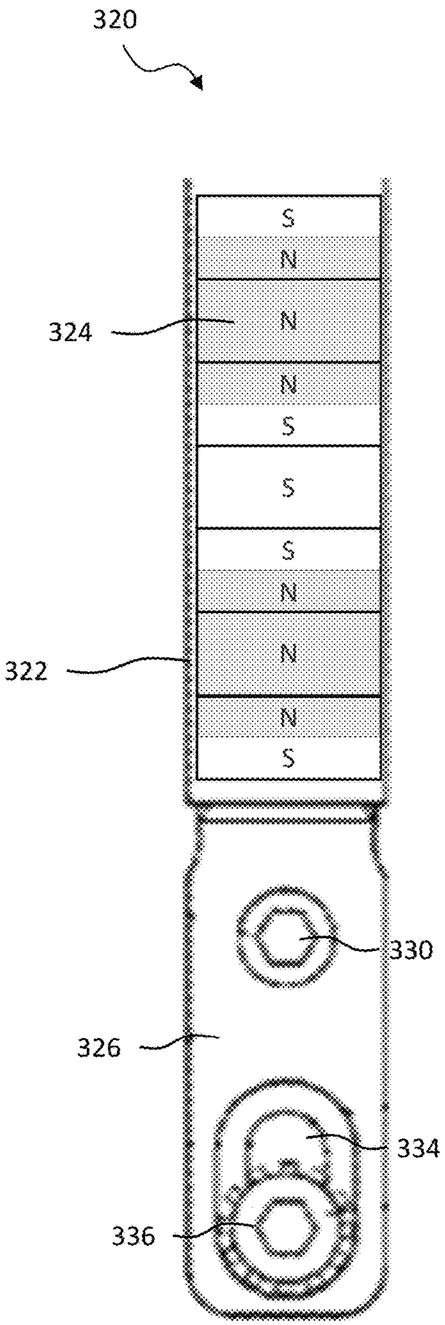
Figure 4D:
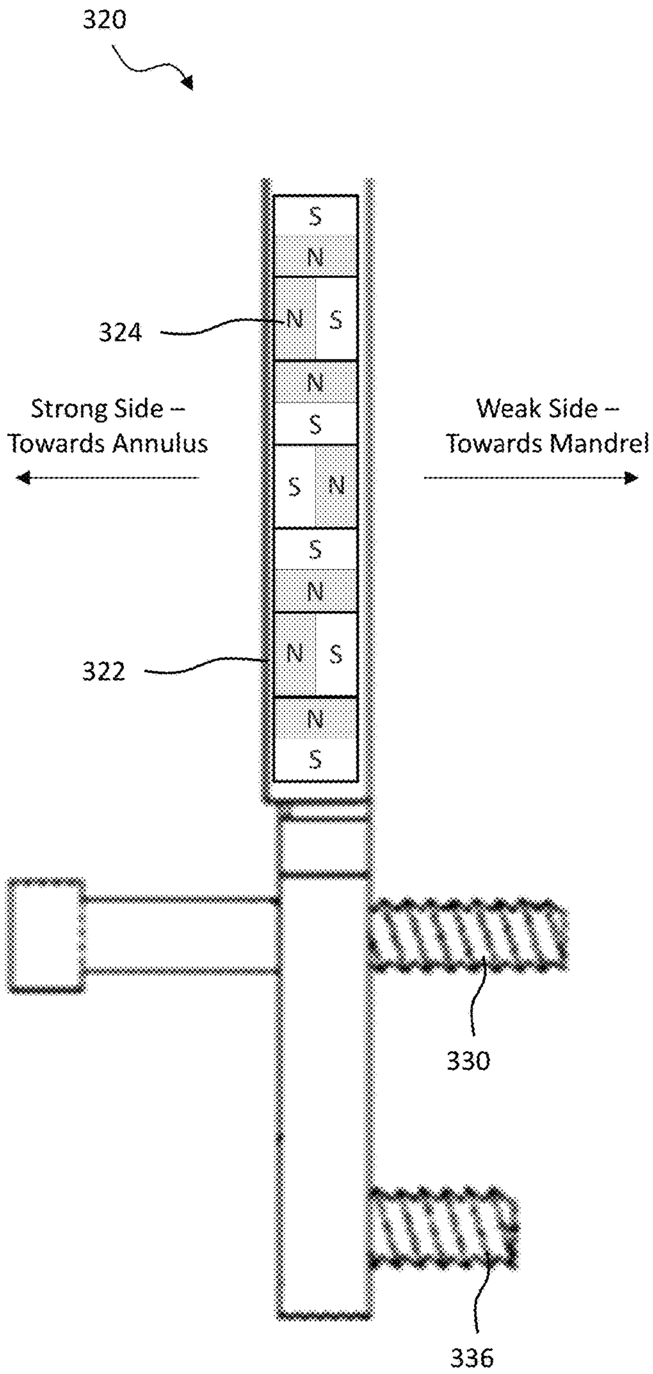

Turning briefly to FIGS. 4C and 4D, illustrated are enlarged views of portions of FIGS. 4A and 4B, respectively. Accordingly, the Halbach array of magnets 324 could be integrated in the magnetic inserts 320, such as is shown with the alternating bars of magnets. Each of the magnets has a north (N) pole and a south (S) pole. In the illustrated embodiment of FIGS. 4C and 4D, each of the magnets are arranged such that the Halbach array of magnets 324 is formed. In the embodiment of FIGS. 4C and 4D, as is evident, three similar poles of the magnets surround a single opposite pole of the magnets, again thereby forming the Halbach array of magnets 324. Further to the embodiment of FIGS. 4C and 4D, the Halbach array of magnets 324 are arranged such that the strong side of the Halbach array of magnets 324 is directed away from the housing body (e.g., toward the annulus in one embodiment), and the weak side of the Halbach array of magnets 324 is directed toward the housing, which in this embodiment is a tool body.

Figure 5A:
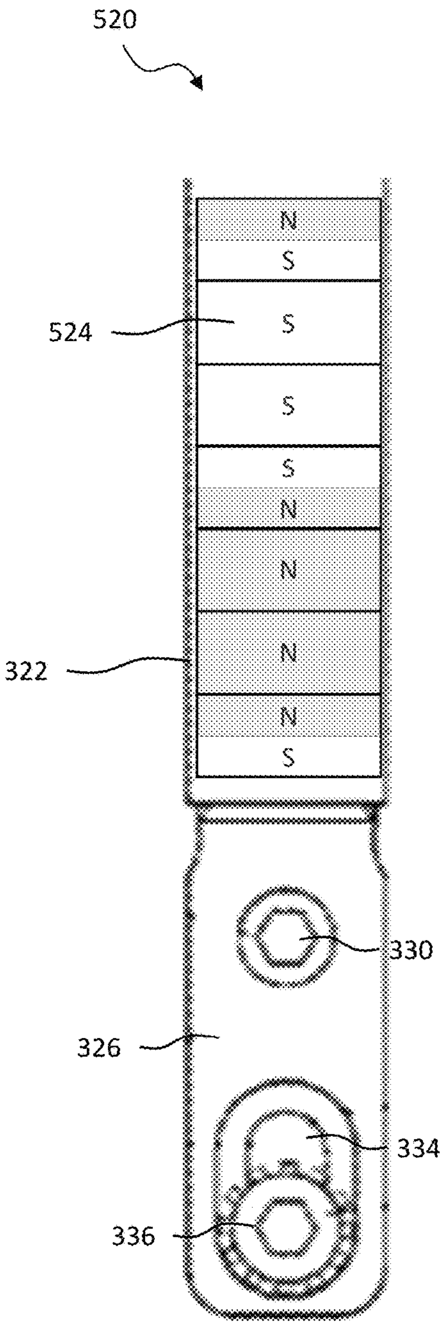
FIGS. 5A and 5B illustrates an alternative embodiment of a magnetic insert, wherein four similar polarity magnets surround two opposite polarity magnets.
Figure 5B:
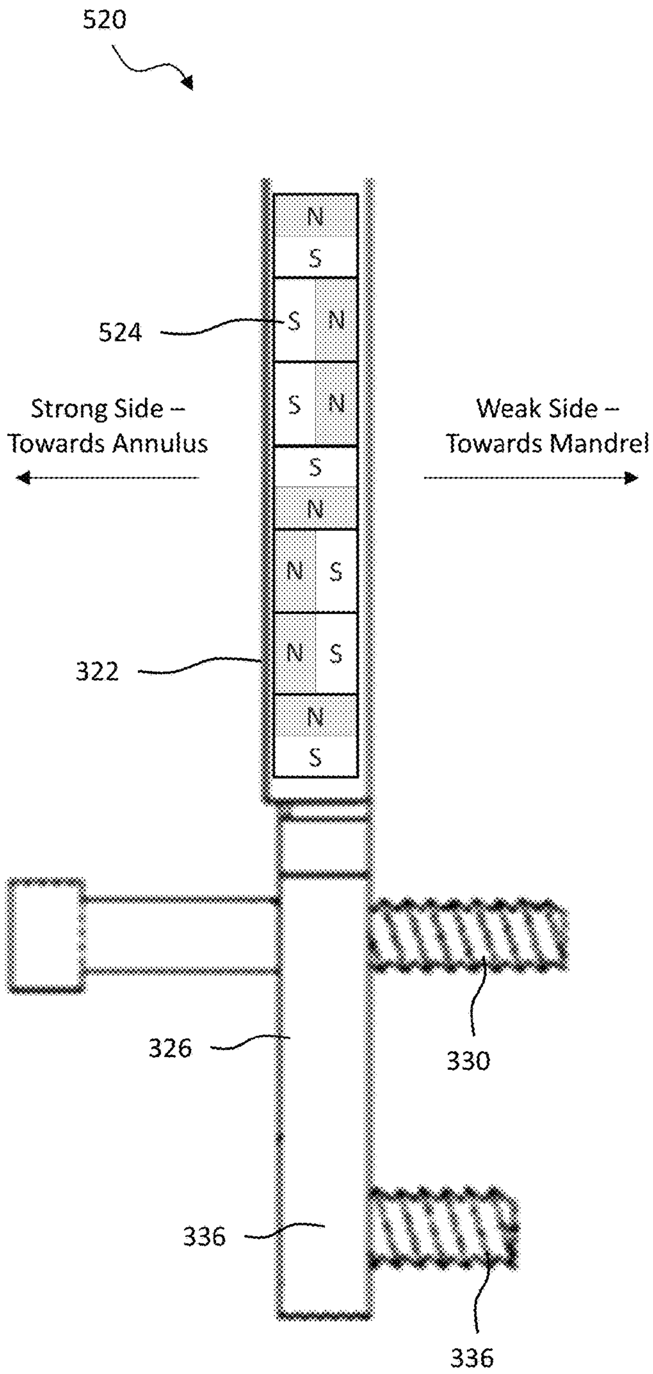

Turning briefly to FIGS. 5A and 5B, illustrated is an alternative embodiment of a magnetic insert 520, wherein four similar poles of the magnets surround two opposite poles of the magnets, again thereby forming the Halbach array of magnets 524. It should be noted that while the embodiments of FIGS. 4A through 4D and FIGS. 5A and 5B have a particular polarity orientation for the Halbach array of magnets 324, 524, other embodiments with different polarity orientations for the Halbach array of magnets 324, 524 are within the scope of the disclosure.

Figure 6:
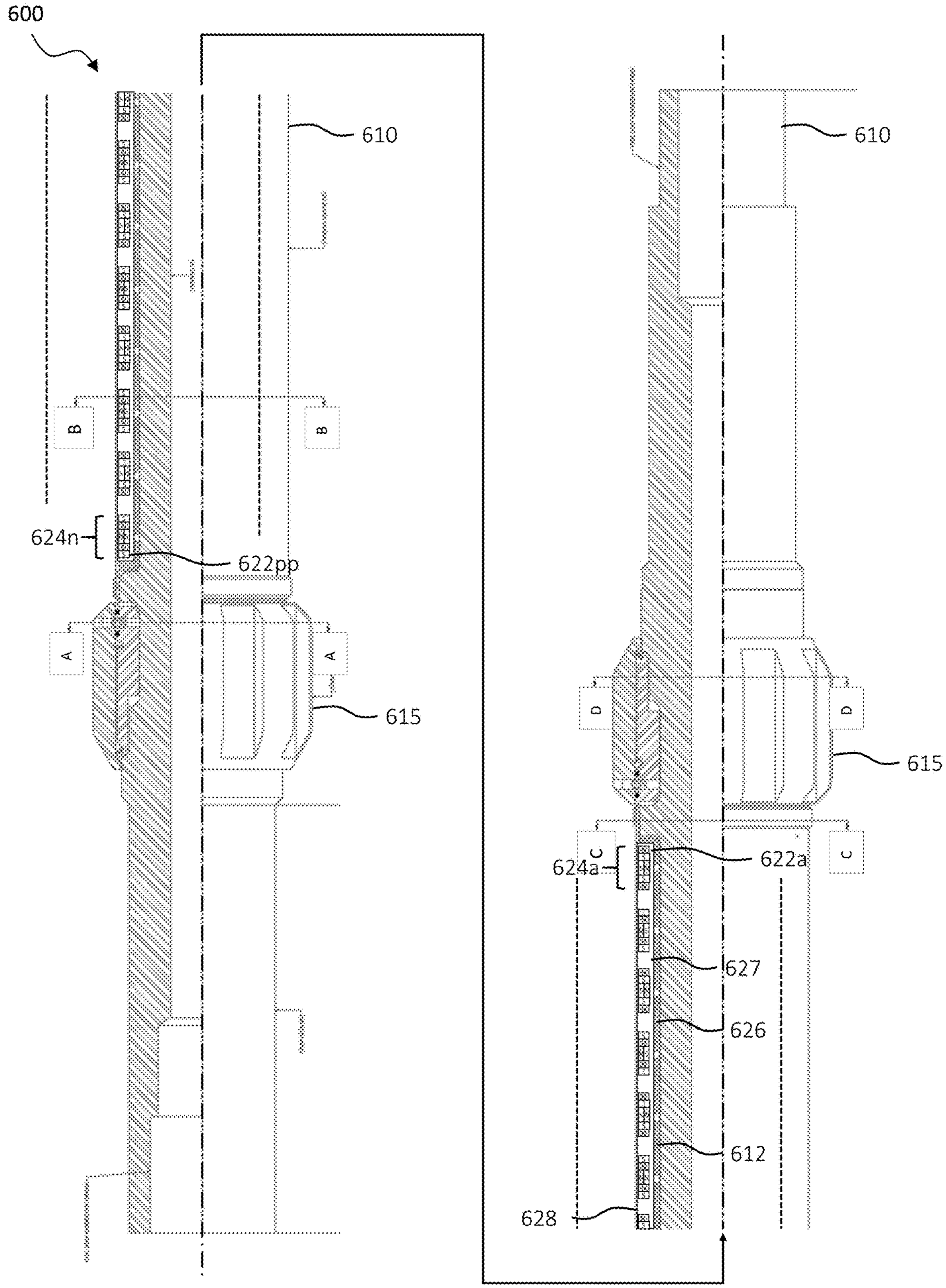
FIGS. 6 through 6D illustrate a downhole magnetic debris removal apparatus designed, manufactured, and operated according to another embodiment of the disclosure.
Figure 6A:
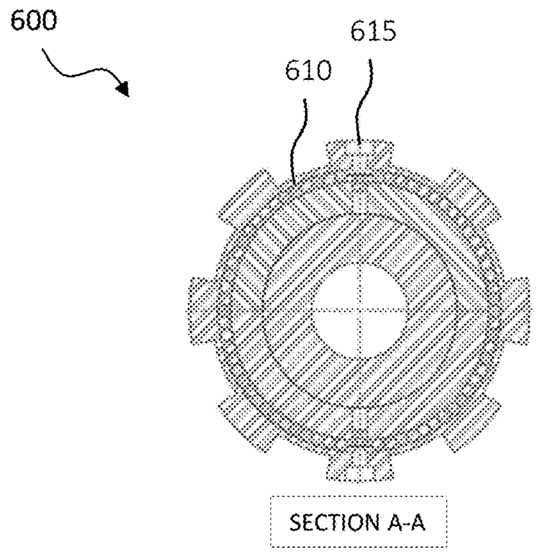
Figure 6B:
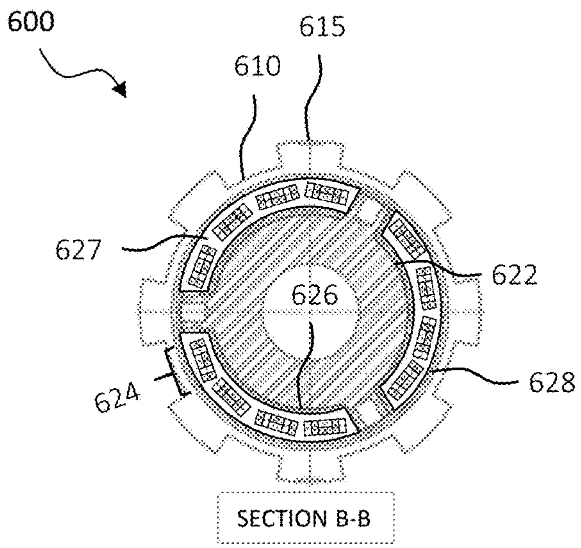
Figure 6C:
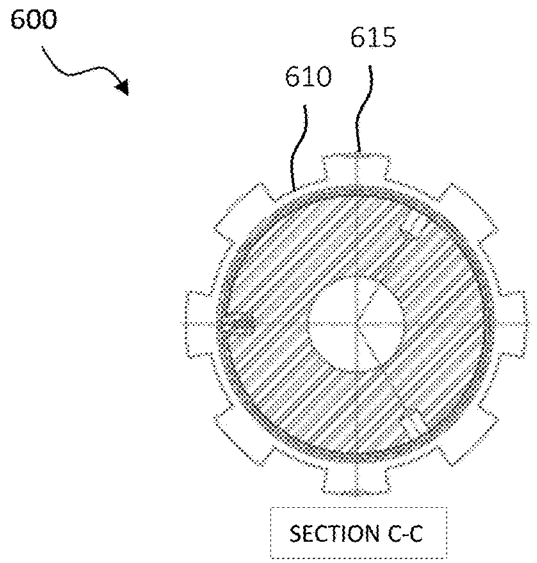
Figure 6D:
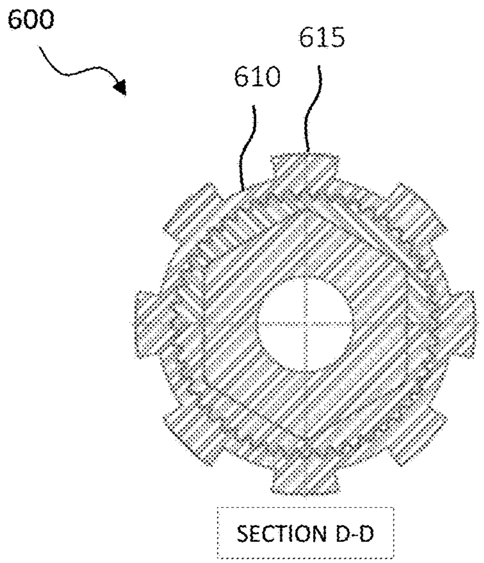

Turning to FIGS. 6 through 6D illustrated is a downhole magnetic debris removal apparatus 600 designed, manufactured, and operated according to another embodiment of the disclosure. FIG. 6 is a cross-section of the downhole magnetic debris removal apparatus 600. Furthermore, FIGS. 6A through 6D are cross-sections of the downhole magnetic debris removal apparatus 600 illustrated in FIG. 6 taken through the lines A-A, B-B, C-C and D-D, respectively. As shown in FIGS. 6 through 6D, the downhole magnetic debris removal apparatus 600 includes a housing 610 having a longitudinal axis. In at least one embodiment, such as that shown in FIG. 6, the housing 610 is a mandrel.

The housing 610 in the embodiment of FIGS. 6 through 6D additionally includes two or more centralizers 615. Those skilled in the art appreciate that the two or more centralizers 615 may be employed to centralize the downhole magnetic debris removal apparatus 600 in a bore when being deployed downhole. The centralizers 615 are illustrated in FIGS. 6 through 6D as two or more rigid protrusions from the housing 610. Nevertheless, other embodiments exist wherein the two or more centralizers 615 are non-rigid structures, such as a spring member or bow spring in one or more embodiments.

Further to the embodiment of FIGS. 6 through 6D, the downhole magnetic debris removal apparatus 600 includes a plurality of magnets 622 arranged as one or more Halbach arrays of magnets 624. In at least one embodiment, the one or more Halbach arrays of magnets 624 are coupled to the housing 610. For example, the one or more Halbach arrays of magnets 624 could be positioned within associated one or more recesses 612 within the housing 610. In the illustrated embodiment, a single recess 612 houses more than one Halbach array of magnets 624.

Further to this embodiment, as will be discussed in greater detail below, the plurality of magnets 622 and the one or more Halbach arrays of magnets 624 may be placed within carriers 626 that surround the housing 610. For example, the carriers 626 could include the one or more recesses 627, which in turn would house the one or more Halbach arrays of magnets 624. The carriers 626 may comprise a non-ferrous material, such as aluminum, in at least one embodiment.

Furthermore, a retaining sleeve 628, may also be positioned around the carriers 626 having the one or more Halbach arrays of magnets 624 therein, so as to keep the one or more Halbach arrays of magnets 624 within the downhole magnetic debris removal apparatus 600. In one or more embodiments, the retaining sleeve 628 also comprises a non-ferrous material. In at least one embodiment, the retaining sleeve 628 comprises stainless steel.

In the illustrated embodiment, the downhole magnetic debris removal apparatus 600 includes 42 magnets 622*a*-622*pp* that are arranged into 14 Halbach arrays of magnets 624*a*-624*n*. Nevertheless, other embodiments for the downhole magnetic debris removal apparatus 600 may include more or less than 42 magnets 622*a*-622*pp* arranged into more or less than 14 Halbach arrays of magnets 624*a*-624*n*.

In the illustrated embodiment of FIGS. 6 through 6D, the individual magnets 622 in each Halbach array of magnets 624 are touching one another, but the individual Halbach arrays of magnets 624 are separated from one another. For example, in at least one embodiment, the Halbach arrays of magnets 624 are separated from one another along the longitudinal axis (e.g., as shown in FIG. 6) of the housing 610, as well as radially from one another about the housing 610 (e.g., as shown in FIG. 6B).

Furthermore, in at least one embodiment, adjacent Halbach arrays of magnets 624 are oppositely arranged. For example, a first of the adjacent Halbach arrays of magnets 624 might be arranged such that multiple South (S) poles of the magnets 622 surround a North (N) pole of the magnets 622, and a second of the adjacent Halbach arrays of magnets 624 might be arranged such that multiple North (N) poles of the magnets 622 surround a South (S) pole of the magnets 622, and so on and so forth. In the embodiment of FIGS. 6 through 6D, each of the one or more Halbach arrays of magnets 624 includes three similar poles of the plurality of magnets surrounding a single opposite pole of the plurality of magnets. Nevertheless, the Halbach arrays of magnets 624 in the embodiment of FIGS. 6 through 6D are arranged such their strong side is directed away from the housing 610 (e.g., toward the annulus in one embodiment), and their weak side is directed toward the housing 610.

Further to the embodiment of FIGS. 6 through 6D, a length (L) of each of the plurality of magnets 622 is substantially perpendicular with the longitudinal axis. The term "substantially perpendicular" as used herein, means the length (L) of the plurality of magnets 622 is within 10 degrees of perpendicular with the longitudinal axis. In at least one other embodiment, each of the plurality of magnets 622 is ideally perpendicular with the longitudinal axis. The term "ideally perpendicular" as used herein, means the length (L) of the plurality of magnets 622 is within 2 degrees of perpendicular with the longitudinal axis.

Figure 7:
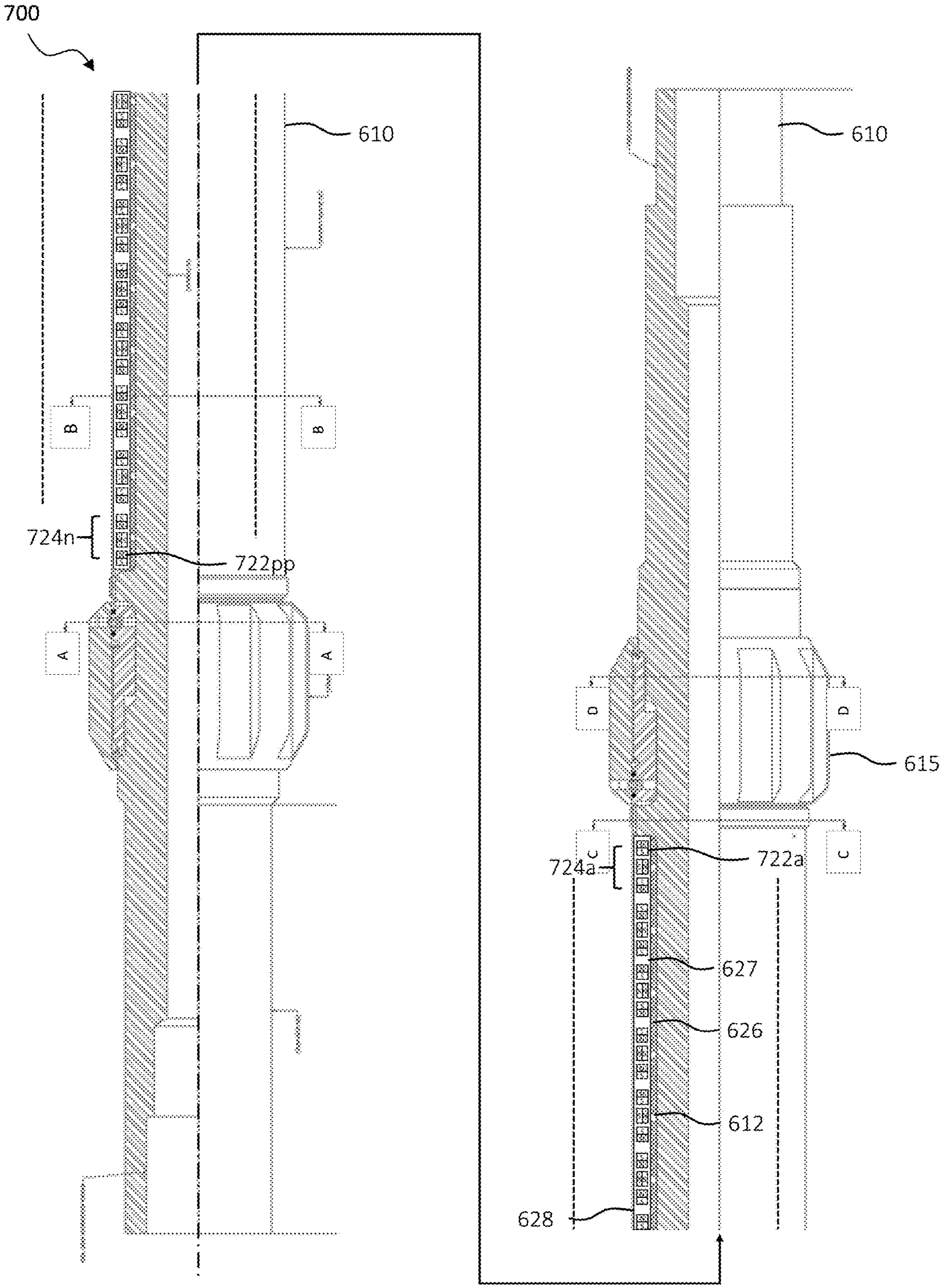
FIGS. 7 through 7D illustrate a downhole magnetic debris removal apparatus designed, manufactured, and operated according to another embodiment of the disclosure.
Figure 7A:
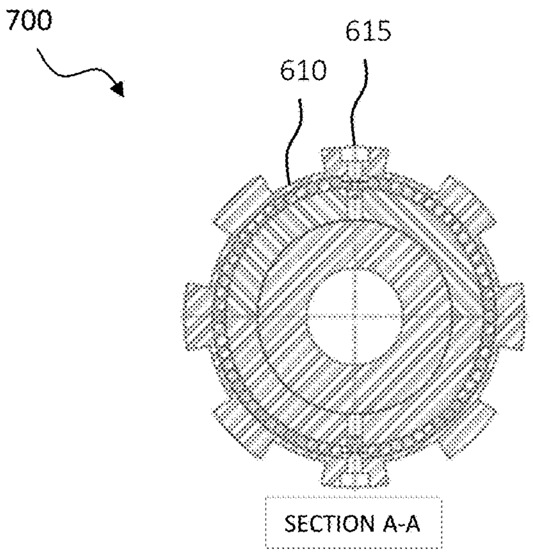
Figure 7B:
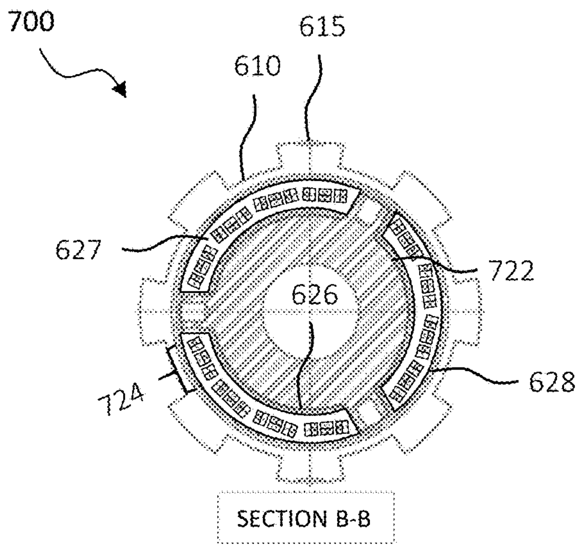
Figure 7C:
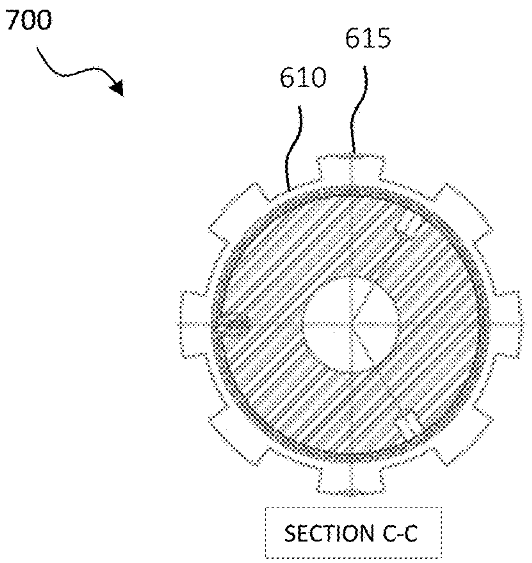
Figure 7D:
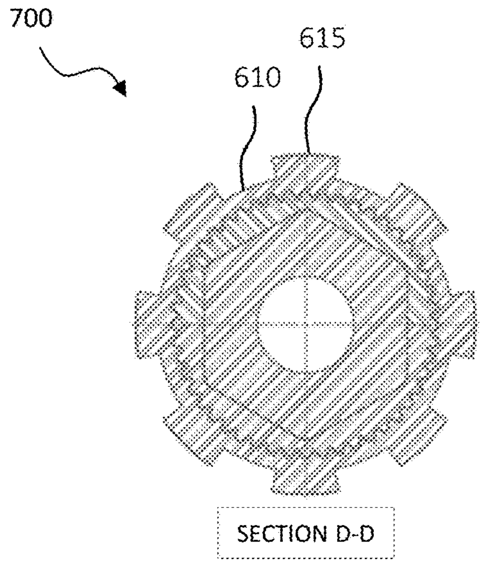

Turning to FIGS. 7 through 7D illustrated is a downhole magnetic debris removal apparatus 700 designed, manufactured, and operated according to another embodiment of the disclosure. FIG. 7 is a cross-section of the downhole magnetic debris removal apparatus 700. Furthermore, FIGS. 7A through 7D are cross-sections of the downhole magnetic debris removal apparatus 700 illustrated in FIG. 7 taken through the lines A-A, B-B, C-C and D-D, respectively. The downhole magnetic debris removal apparatus 700 is similar in many respects to the downhole magnetic debris removal apparatus 600. Accordingly, like reference numbers have been used to illustrate similar, if not identical, features. The downhole magnetic debris removal apparatus 700 differs, for the most part, from the downhole magnetic debris removal apparatus 600, in that the plurality of magnets 722 in each of the Halbach arrays of magnets 724 have a spacing therebetween, as opposed to touching, as was employed in FIGS. 6 through 6D.

Figure 8:
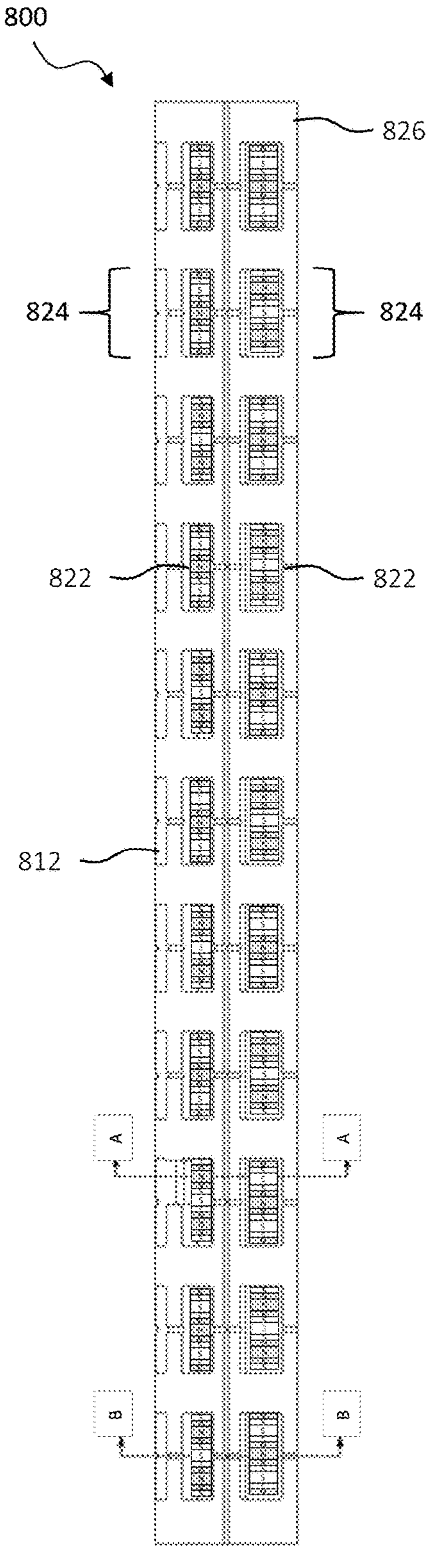
FIGS. 8 through 8B illustrate a downhole magnetic debris removal apparatus designed, manufactured, and operated according to another embodiment of the disclosure.
Figure 8A:
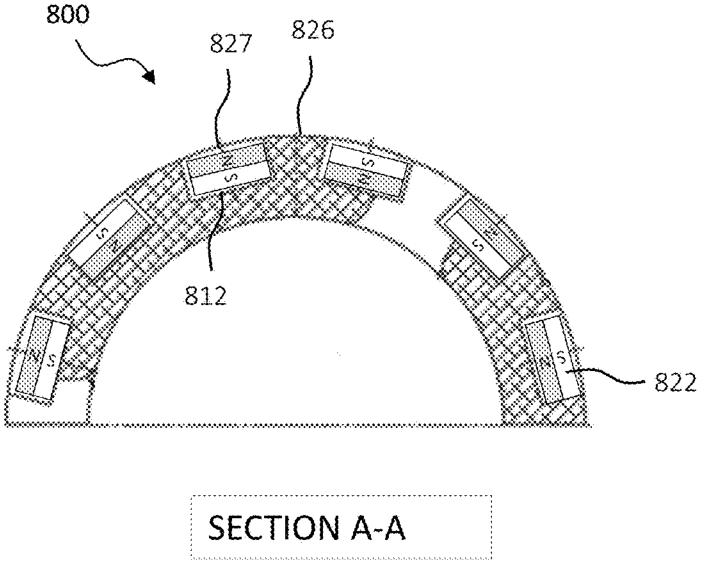
Figure 8B:
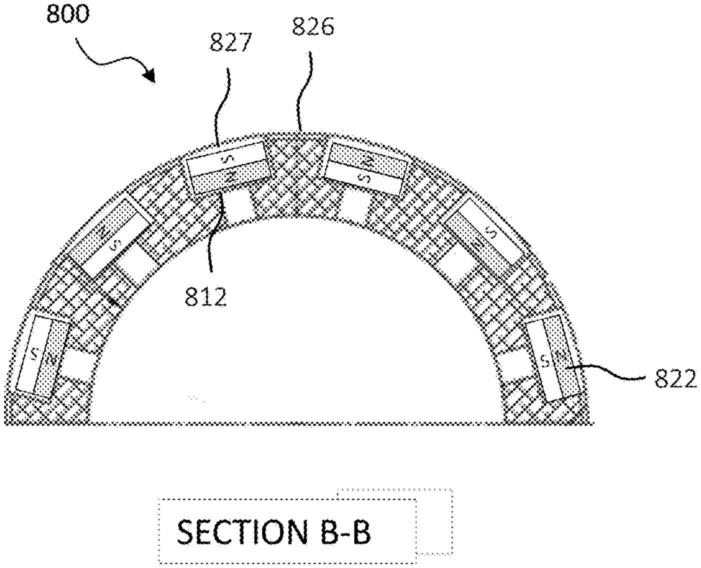

Turning to FIGS. 8 through 8B illustrated is a downhole magnetic debris removal apparatus 800 designed, manufactured, and operated according to another embodiment of the disclosure. FIG. 8 is a cross-section of the downhole magnetic debris removal apparatus 800. Furthermore, FIGS. 8A and 8B are cross-sections of the downhole magnetic debris removal apparatus 800 illustrated in FIG. 8 taken through the lines A-A and B-B, respectively. The downhole magnetic debris removal apparatus 800 is similar in many respects to the downhole magnetic debris removal apparatus 600. Accordingly, like reference numbers have been used to illustrate similar, if not identical, features. The downhole magnetic debris removal apparatus 800 differs, for the most part, from the downhole magnetic debris removal apparatus 600 in that the carrier 826 includes multiple recesses 827 that are offset from one another along the longitudinal axis, but are also radially offset from one another.

Figure 9:
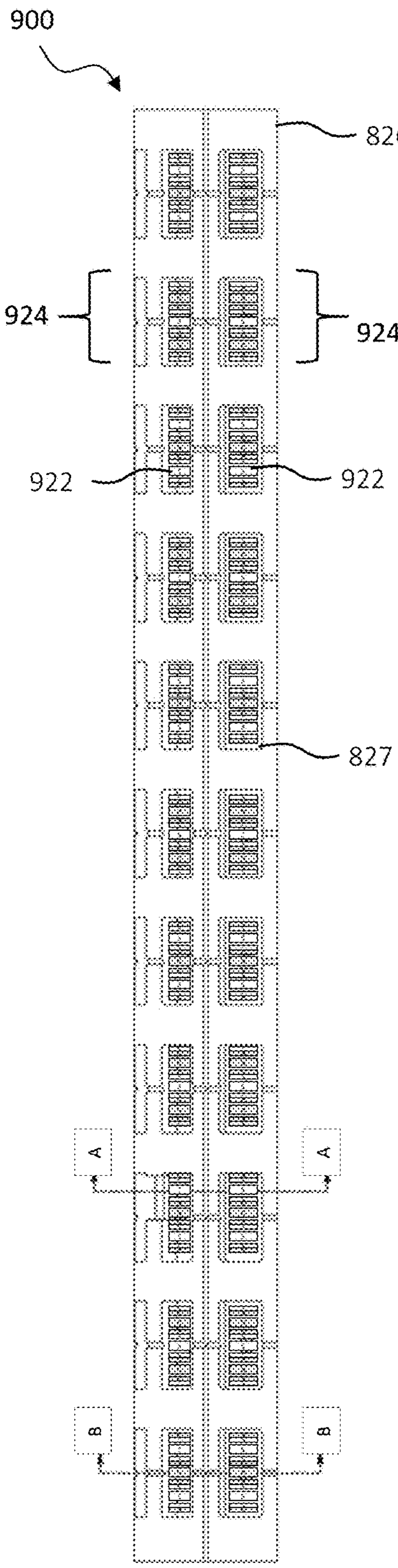
FIGS. 9 through 9B illustrate a downhole magnetic debris removal apparatus designed, manufactured, and operated according to another embodiment of the disclosure.
Figure 9A:
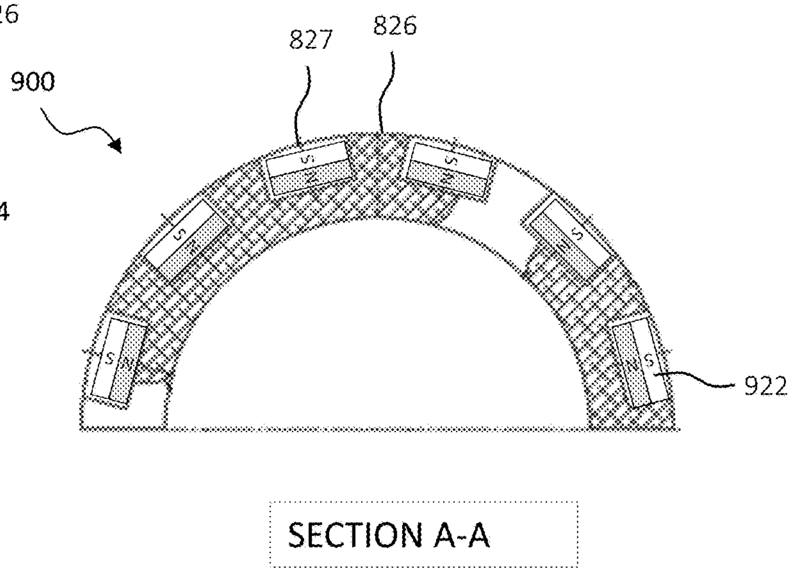
Figure 9B:
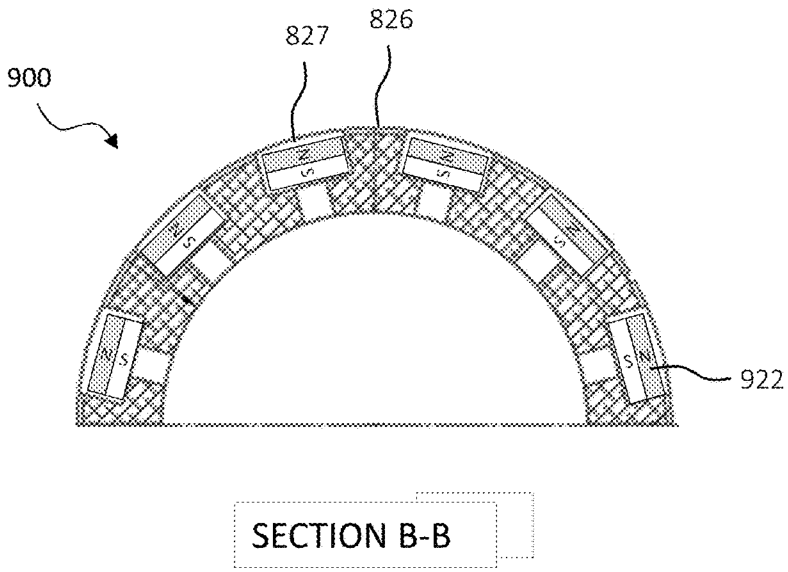

Turning to FIGS. 9 through 9B illustrated is a downhole magnetic debris removal apparatus 900 designed, manufactured, and operated according to another embodiment of the disclosure. FIG. 9 is a cross-section of the downhole magnetic debris removal apparatus 900. Furthermore, FIGS. 9A and 9B are cross-sections of the downhole magnetic debris removal apparatus 900 illustrated in FIG. 9 taken through the lines A-A and B-B, respectively. The downhole magnetic debris removal apparatus 900 is similar in many respects to the downhole magnetic debris removal apparatus 800. Accordingly, like reference numbers have been used to illustrate similar, if not identical, features. The downhole magnetic debris removal apparatus 900 differs, for the most part, from the downhole magnetic debris removal apparatus 800, in that its plurality of magnets 922 of its one or more Halbach arrays of magnets 924 are spaced apart from one another.

Figure 10:
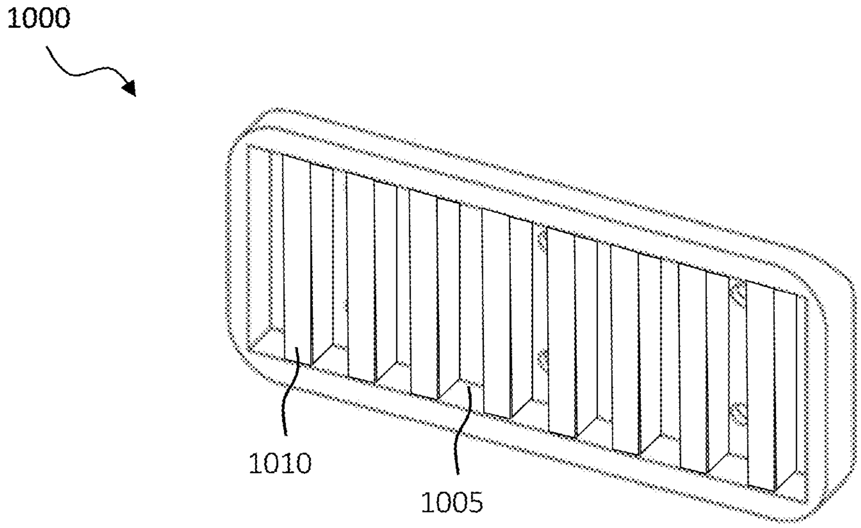
FIG. 10 illustrates a carrier designed, manufactured and operated according to one embodiment of the disclosure.

Turnings to FIG. 10, illustrated is a carrier 1000 designed, manufactured and operated according to one embodiment of the disclosure. In accordance with one embodiment, the carrier 1000 is configured to be placed within a recess in a housing of a downhole magnetic debris removal apparatus. In the illustrated embodiment, the carrier 1000 includes a recess 1005 having optional spacers 1010 placed therein. In at least one embodiment, the optional spacers 1010 are configured to space the magnets apart from one another. The optional spacers 1010, in at least one embodiment, comprise a non-ferrous material. The carrier 1000 could be used with a downhole magnetic debris removal apparatus similar to the downhole magnetic debris removal apparatus 900 illustrated in FIG. 9. For example, the carrier 1000 could be positioned within recesses of previous figures, or alternatively placed within the sleeve of previous figures, and remain within the scope of the disclosure.

Figure 11:
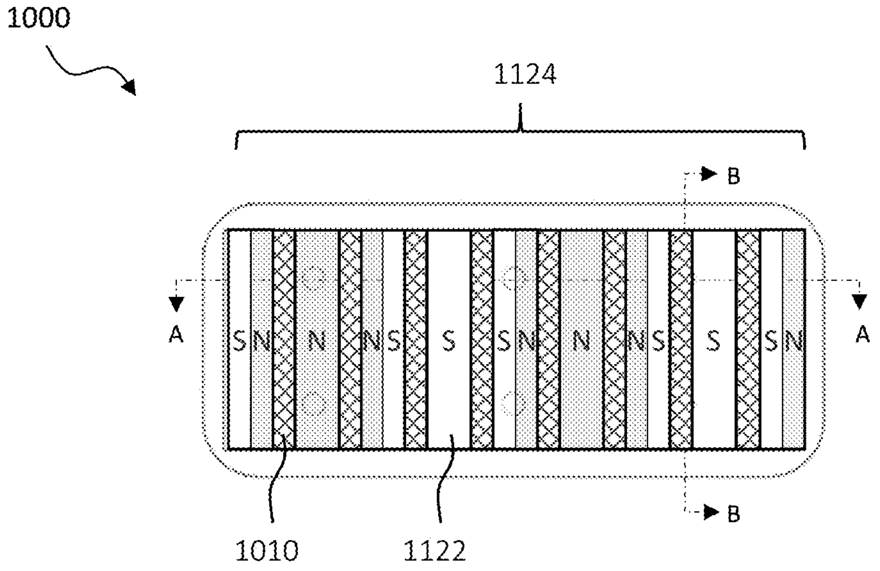
FIGS. 11 through 11B illustrate the carrier designed, manufactured and operated according to FIG. 10, but including a plurality of magnets arranged as a Halbach array of magnets.
Figure 11A:
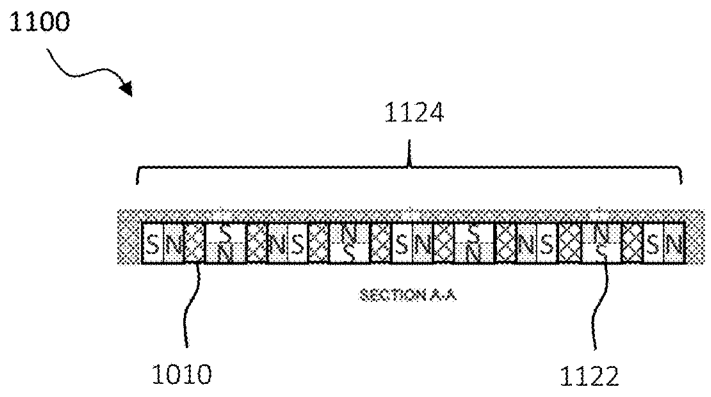
Figure 11B:
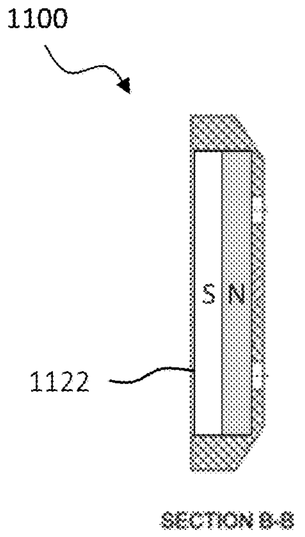

Turnings to FIGS. 11 through 11B, illustrated is a carrier 1000 designed, manufactured and operated according to FIG. 10, but including a plurality of magnets 1122 arranged as a Halbach array of magnets 1124. FIG. 11 is a cross-section of the carrier 1000. Furthermore, FIGS. 11A and 11B are cross-sections of the carrier 1000 illustrated in FIG. 11 taken through the lines A-A and B-B, respectively.

Figure 12:
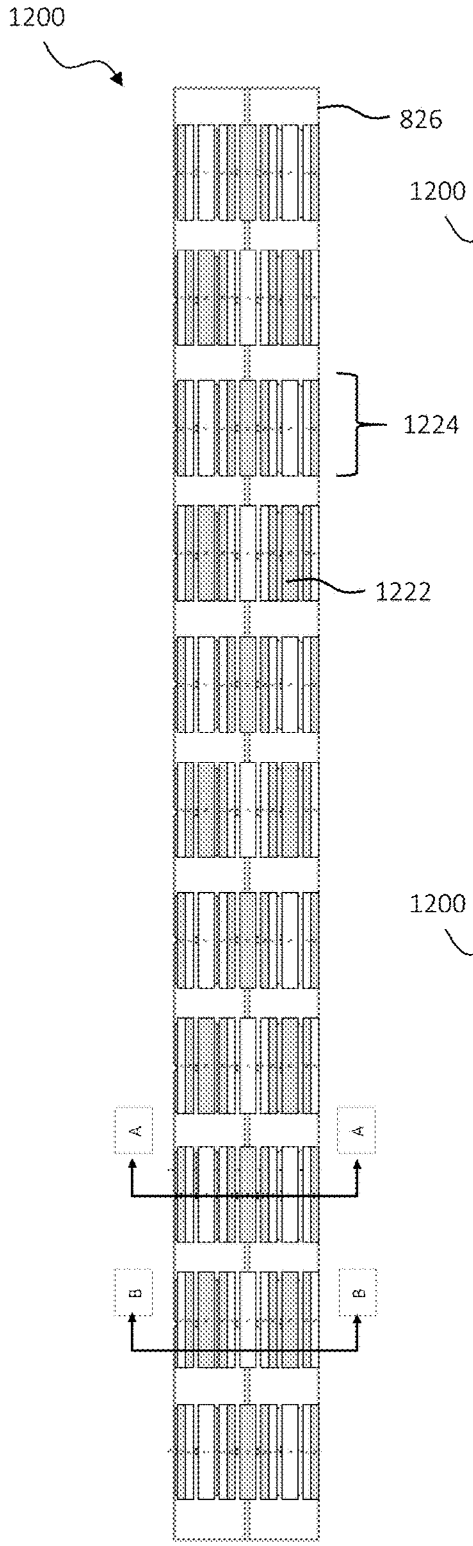
FIGS. 12 through 12B illustrate a downhole magnetic debris removal apparatus designed, manufactured, and operated according to another embodiment of the disclosure.
Figure 12A:
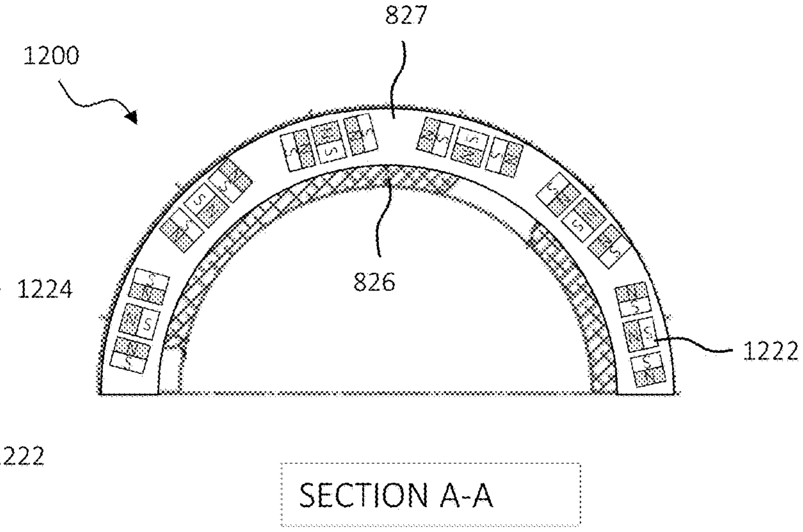
Figure 12B:
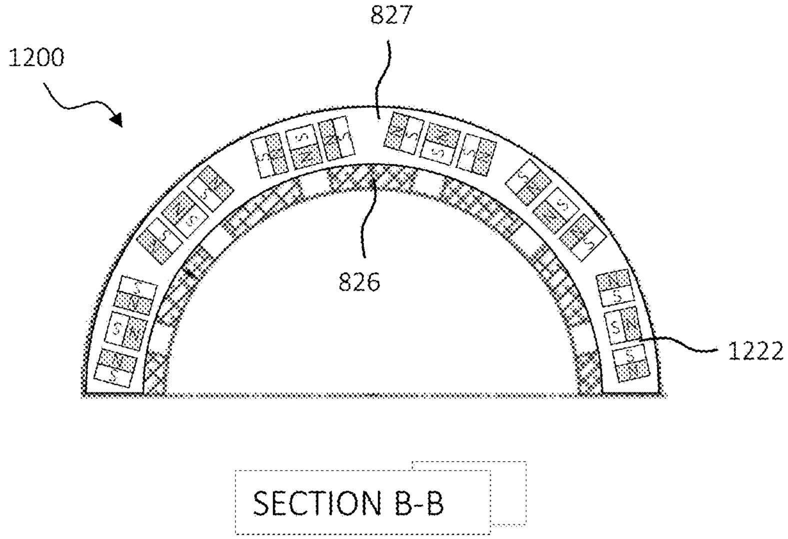

Turning to FIGS. 12 through 12B illustrated is a downhole magnetic debris removal apparatus 1200 designed, manufactured, and operated according to another embodiment of the disclosure. FIG. 12 is a cross-section of the downhole magnetic debris removal apparatus 1200. Furthermore, FIGS. 12A and 12B are cross-sections of the downhole magnetic debris removal apparatus 1200 illustrated in FIG. 12 taken through the lines A-A and B-B, respectively. The downhole magnetic debris removal apparatus 1200 is similar in many respects to the downhole magnetic debris removal apparatus 900. Accordingly, like reference numbers have been used to illustrate similar, if not identical, features.

The downhole magnetic debris removal apparatus 1200 differs, for the most part, from the downhole magnetic debris removal apparatus 900, in that its plurality of magnets 1222 are positioned such that their length (L) is substantially parallel with the longitudinal axis. The term "substantially parallel" as used herein, means the length (L) of the plurality of magnets 1222 is within 10 degrees of parallel of the longitudinal axis. In at least one other embodiment, each of the plurality of magnets 1222 is ideally parallel with the longitudinal axis. The term "ideally parallel" as used herein, means the length (L) of the plurality of magnets 1222 is within 2 degrees of parallel of the longitudinal axis.

Turning to FIGS. 13A through 13C, illustrated is yet another embodiment of a downhole magnetic debris removal apparatus 1300 designed, manufactured and operated according to the disclosure, which employs one or more Halbach arrays of magnets 1324. FIG. 13A is a cross-section of the downhole magnetic debris removal apparatus 1300. Furthermore, FIG. 13B is a cross-section of a carrier sleeve 1310 illustrated in FIG. 13A, and FIG. 13C is a cross-section of a carrier 1310 illustrated in FIG. 13A. The downhole magnetic debris removal apparatus 1300 is similar in many respects to the downhole magnetic debris removal apparatus 900. Accordingly, like reference numbers have been used to illustrate similar, if not identical, features. The downhole magnetic debris removal apparatus 1300 includes a housing 610, as well as the carrier sleeve 1310 positioned about the housing 610. In at least on embodiment, the carrier sleeve 1310 includes two or more portions (e.g., two halves in one embodiment), which are placed about the housing 610, and may comprise a non-ferrous material such as aluminum. Positioned within recesses 1315 in the carrier sleeve 1310, are one or more carriers 1320. The carriers 1320, in the illustrated embodiment, house the plurality of magnets 1322 that are arranged to form the one or more Halbach arrays of magnets 1324. The carriers 1320, in at least one embodiment, include only a single threaded opening 132 for engaging the carrier 1320 with a threaded member, and thus retrieving the carriers 1320. In one or more embodiments, a carbon steel plate may be placed radially interior of the one or more Halbach arrays of magnets to amplify the magnetic field on the annulus side.

Turning to FIG. 14, illustrated is one embodiment of a retaining sleeve 1400 designed, manufactured and operated according to one or more embodiments of the disclosure. The retaining sleeve 1400, in at least one embodiment, comprises a non-slotted sleeve configured to slide around the one or more Halbach arrays of magnets, and thus keep the one or more Halbach arrays of magnets within the housing. Further to the embodiment of FIG. 14, the retaining sleeve 1400 includes one or more holes 1410 therein. The holes 1410 in the embodiment of FIG. 14 are located at the bottom of the retaining sleeve 1400, and in at least one embodiment correspond to where a locking pin on the housing will align the retaining sleeve 1400, so that the retaining sleeve 1400 is properly lined up with the housing.

Turning to FIG. 15, illustrated is an alternative embodiment of a retaining sleeve 1500 designed, manufactured and operated according to one or more embodiments of the disclosure. The retaining sleeve 1500, in at least one embodiment, comprises a slotted sleeve configured to slide around the one or more Halbach arrays of magnets, and thus keep the one or more Halbach arrays of magnets within the housing. In at least one embodiment, the slots 1505 are slightly smaller than the one or more Halbach arrays of magnets to ensure that the retaining sleeve 1500 still works to hold the magnet bar from falling out. Further to the embodiment of FIG. 15, the retaining sleeve 1500 includes one or more holes 1510 therein. The holes 1510 in the embodiment of FIG. 15 are located at the bottom of the retaining sleeve 1500, and in at least one embodiment correspond to where a locking pin on the housing will align the retaining sleeve 1400, so that the slots 1505 in the retaining sleeve 1500 align with the one or more Halbach arrays of magnets.

Aspects disclosed herein include:

A. A downhole magnetic debris removal apparatus, the downhole magnetic debris removal apparatus including: 1) a housing having a longitudinal axis; and 2) a plurality of magnets arranged as one or more Halbach arrays of magnets coupled to the housing, the one or more Halbach arrays of magnets having a strong side and a weak side.

B. A method for cleaning a wellbore, the method including: 1) lowering a downhole magnetic debris removal apparatus within a wellbore using a conveyance, the downhole magnetic debris removal apparatus including: a) a housing having a longitudinal axis; and b) a plurality of magnets arranged as one or more Halbach arrays of magnets coupled to the housing, the one or more Halbach arrays of magnets having a strong side and a weak side; and 2) moving the downhole magnetic debris removal apparatus up and down within the wellbore to collect magnetic debris.

C. A well system, the well system including: 1) a wellbore; and 2) a downhole magnetic debris removal apparatus positioned within the wellbore using a conveyance, the downhole magnetic debris removal apparatus including: a) a housing having a longitudinal axis; and b) a plurality of magnets arranged as one or more Halbach arrays of magnets coupled to the housing, the one or more Halbach arrays of magnets having a strong side and a weak side.

Aspects A, B, and C may have one or more of the following additional elements in combination: Element 1: wherein each of the one or more Halbach arrays of magnets includes three similar poles of the plurality of magnets surrounding a single opposite pole of the plurality of magnets. Element 2: wherein each of the one or more Halbach arrays of magnets includes four similar poles of the plurality of magnets surrounding two opposite poles of the plurality of magnets. Element 3: wherein each of the plurality of magnets have a width (W), height (H), and length (L), and further wherein the length (L) of the plurality of magnets is substantially parallel with the longitudinal axis. Element 4: wherein each of the plurality of magnets have a width (W), height (H), and length (L), and further wherein the length (L) of the plurality of magnets is substantially perpendicular with the longitudinal axis. Element 5: wherein the housing has one or more recesses, and further wherein the one or more Halbach arrays of magnets are located within the one or more recesses. Element 6: wherein the one or more Halbach arrays of magnets are positioned within one or more carriers, and further wherein the one or more carriers are located within the one or more recesses. Element 7: further including one or more magnetic inserts positioned within the housing, each of the one or more magnetic inserts including a sleeve holding the plurality of magnets arranged as one or more Halbach arrays of magnets. Element 8: further including two or more centralizers coupled to the housing. Element 9: wherein the housing is a mandrel, and further wherein a strong side of the one or more Halbach arrays of magnets is directed away from the mandrel, and a weak side of the one or more Halbach arrays of magnets is directed toward the mandrel. Element 10: wherein each of the one or more Halbach arrays of magnets includes three similar poles of the plurality of magnets surrounding a single opposite pole of the plurality of magnets. Element 11: wherein each of the one or more Halbach arrays of magnets includes four similar poles of the plurality of magnets surrounding two opposite poles of the plurality of magnets. Element 12: wherein each of the plurality of magnets have a width (W), height (H), and length (L), and further wherein the length (L) of the plurality of magnets is substantially parallel with the longitudinal axis. Element 13: wherein each of the plurality of magnets have a width (W), height (H), and length (L), and further wherein the length (L) of the plurality of magnets is substantially perpendicular with the longitudinal axis. Element 14: wherein each of the one or more Halbach arrays of magnets includes three similar poles of the plurality of magnets surrounding a single opposite pole of the plurality of magnets. Element 15: wherein each of the one or more Halbach arrays of magnets includes four similar poles of the plurality of magnets surrounding two opposite poles of the plurality of magnets. Element 16: wherein each of the plurality of magnets have a width (W), height (H), and length (L), and further wherein the length (L) of the plurality of magnets is substantially parallel with the longitudinal axis. Element 17: wherein each of the plurality of magnets have a width (W), height (H), and length (L), and further wherein the length (L) of the plurality of magnets is substantially perpendicular with the longitudinal axis.

Those skilled in the art to which this application relates will appreciate that other and further additions, deletions, substitutions and modifications may be made to the described embodiments.

What is claimed is:

1. A downhole magnetic debris removal apparatus, comprising:
- a housing having a longitudinal axis; and
- a plurality of magnets arranged as Halbach arrays of magnets coupled to the housing, the Halbach arrays of magnets having a strong side and a weak side, wherein at least a first Halbach array of the Halbach arrays of magnets and a second Halbach array of the Halbach arrays of magnets are linearly aligned and touching each other within a carrier capable of independently retaining the plurality of magnets.

2. The downhole magnetic debris removal apparatus as recited in claim 1, wherein each of the Halbach arrays of magnets includes three similar poles of the plurality of magnets surrounding a single opposite pole of the plurality of magnets.

3. The downhole magnetic debris removal apparatus as recited in claim 1, wherein each of the Halbach arrays of magnets includes four similar poles of the plurality of magnets surrounding two opposite poles of the plurality of magnets.

4. The downhole magnetic debris removal apparatus as recited in claim 1, wherein each of the plurality of magnets has a width (W), height (H), and length (L), and further wherein the length (L) of the plurality of magnets is substantially parallel with the longitudinal axis.

5. The downhole magnetic debris removal apparatus as recited in claim 1, wherein each of the plurality of magnets has a width (W), height (H), and length (L), and further wherein the length (L) of the plurality of magnets is substantially perpendicular with the longitudinal axis.

6. The downhole magnetic debris removal apparatus as recited in claim 1, wherein the housing has one or more recesses, and further wherein the one or more Halbach arrays of magnets are located within the one or more recesses.

7. The downhole magnetic debris removal apparatus as recited in claim 6, wherein the carrier is located within a recess of the one or more recesses.

8. The downhole magnetic debris removal apparatus as recited in claim 1, wherein the carrier is a magnetic insert positioned within the housing, the magnetic insert including a sleeve holding the plurality of magnets arranged as one or more Halbach arrays of magnets.

9. The downhole magnetic debris removal apparatus as recited in claim 1, further including two or more centralizers coupled to the housing.

10. The downhole magnetic debris removal apparatus as recited in claim 1, wherein the housing is a mandrel, and further wherein a strong side of the Halbach arrays of magnets is directed away from the mandrel, and a weak side of the Halbach arrays of magnets is directed toward the mandrel.

11. A method for cleaning a wellbore, comprising:
- lowering a downhole magnetic debris removal apparatus within a wellbore using a conveyance, the downhole magnetic debris removal apparatus including:
  - a housing having a longitudinal axis; and
  - a plurality of magnets arranged as Halbach arrays of magnets coupled to the housing, the Halbach arrays of magnets having a strong side and a weak side, wherein at least a first Halbach array of the Halbach arrays of magnets and a second Halbach array of the Halbach arrays of magnets are linearly aligned and touching each other within a carrier capable of independently retaining the plurality of magnets; and
- moving the downhole magnetic debris removal apparatus up and down within the wellbore to collect magnetic debris.

12. The method as recited in claim 11, wherein each of the Halbach arrays of magnets includes three similar poles of the plurality of magnets surrounding a single opposite pole of the plurality of magnets.

13. The method as recited in claim 11, wherein each of the Halbach arrays of magnets includes four similar poles of the plurality of magnets surrounding two opposite poles of the plurality of magnets.

14. The method as recited in claim 11, wherein each of the plurality of magnets has a width (W), height (H), and length (L), and further wherein the length (L) of the plurality of magnets is substantially parallel with the longitudinal axis.

15. The method as recited in claim 11, wherein each of the plurality of magnets has a width (W), height (H), and length (L), and further wherein the length (L) of the plurality of magnets is substantially perpendicular with the longitudinal axis.

16. A well system, comprising:
- a wellbore; and
- a downhole magnetic debris removal apparatus positioned within the wellbore using a conveyance, the downhole magnetic debris removal apparatus including:
  - a housing having a longitudinal axis; and
  - a plurality of magnets arranged as Halbach arrays of magnets coupled to the housing, the Halbach arrays of magnets having a strong side and a weak side, wherein at least a first Halbach array of the Halbach arrays of magnets and a second Halbach array of the Halbach arrays of magnets are linearly aligned and touching each other within a carrier capable of independently retaining the plurality of magnets.

17. The well system as recited in claim 16, wherein each of the Halbach arrays of magnets includes three similar poles of the plurality of magnets surrounding a single opposite pole of the plurality of magnets.

18. The well system as recited in claim 16, wherein each of the Halbach arrays of magnets includes four similar poles of the plurality of magnets surrounding two opposite poles of the plurality of magnets.

19. The well system as recited in claim 16, wherein each of the plurality of magnets has a width (W), height (H), and length (L), and further wherein the length (L) of the plurality of magnets is substantially parallel with the longitudinal axis.

20. The well system as recited in claim 16, wherein each of the plurality of magnets has a width (W), height (H), and length (L), and further wherein the length (L) of the plurality of magnets is substantially perpendicular with the longitudinal axis.

* * * * *